United States Patent [19]

Barnard

[11] 3,873,818

[45] Mar. 25, 1975

[54] ELECTRONIC TESTER FOR TESTING DEVICES HAVING A HIGH CIRCUIT DENSITY

[75] Inventor: John Dudley Barnard, Wappingers Falls, N.Y.

[73] Assignee: International Business Machines Corporation, Armonk, N.Y.

[22] Filed: Oct. 29, 1973

[21] Appl. No.: 410,592

[52] U.S. Cl...... 235/153 AC, 324/73 R, 324/73 AT, 340/172.5

[51] Int. Cl......................... G06f 15/20, G01r 31/28

[58] Field of Search.... 235/92 SH, 151.31, 153 AC, 235/154; 307/203, 221 R; 324/73 R, 73 AT; 328/37, 97, 104; 340/172.5, 347 DD

[56] References Cited

UNITED STATES PATENTS

| | | | |
|---|---|---|---|
| 3,546,582 | 12/1970 | Barnard et al. | 324/73 R |
| 3,581,074 | 5/1971 | Waltz | 235/153 AC |
| 3,651,315 | 3/1972 | Collins | 235/151.31 |
| 3,655,959 | 4/1972 | Chernow et al. | 235/153 AC |
| 3,764,995 | 10/1973 | Helf et al. | 340/172.5 |
| 3,771,130 | 11/1973 | Moses | 328/97 X |

*Primary Examiner*—Felix D. Gruber
*Assistant Examiner*—R. Stephen Dildine, Jr.
*Attorney, Agent, or Firm*—Wesley De Bruin

[57] ABSTRACT

An electronic tester for testing an electronic structure having high circuit density, such as large scale integrated devices, system, and subsystem structures having a plurality of interconnected large scale integrated devices, and the like. The tester utilizes m words each containing *n* binary bits, where *m* is any integer in the range of one hundred through multiple thousands and *n* is any integer in the range of one hundred through multiple hundreds. The *n* binary bits of each word are respectively electrical manifestations employed by the tester to test the device under test. Where all, or a number, of said m words differ in content in one, or only a limited number of bit positions, only a complete one of said m words will be stored and only selected portions of the remaining similar words will be stored. Means is provided for reconstructing a discrete *n* binary bit word corresponding to each said stored selected portion of an *n* binary-bit word. Thus where *m* words each having n binary bits are required and certain of said *m* words differ from others of said *m* words in only a limited number of bits the practice of applicant's invention accomplishes a material reduction in the size of the store required.

51 Claims, 11 Drawing Figures

OPERATIONAL CODES SPECIFIED BY OPERATIONAL CODE BITS a,b,c,d

| LOGICAL CONTENT OPERATIONAL CODE SPECIFYING BITS FROM RAM | | | | OPERATIONAL CODE | MNEMONIC |
|---|---|---|---|---|---|
| a | b | c | d | | |
| 0 | 0 | 0 | 0 | SET $\overline{LOAD}$, OUT, $\overline{MASK}$ | S$\bar{L}\bar{I}\bar{M}$ |
| 0 | 0 | 0 | 1 | SET $\overline{LOAD}$, OUT, MASK | S$\bar{L}\bar{I}$M |
| 0 | 0 | 1 | 0 | SET $\overline{LOAD}$, IN, $\overline{MASK}$ | S$\bar{L}$I$\bar{M}$ |
| 0 | 0 | 1 | 1 | SET $\overline{LOAD}$, IN, MASK | S$\bar{L}$IM |
| 0 | 1 | 0 | 0 | SET LOAD, OUT $\overline{MASK}$ | SL$\bar{I}\bar{M}$ |
| 0 | 1 | 0 | 1 | SET LOAD, OUT MASK | SL$\bar{I}$M |
| 0 | 1 | 1 | 0 | SET LOAD, IN $\overline{MASK}$ | SLI$\bar{M}$ |
| 0 | 1 | 1 | 1 | SET LOAD, IN MASK | SLIM |
| 1 | 0 | 0 | 0 | SET NUMBER OF SERIAL TESTS | SNST |
| 1 | 0 | 0 | 1 | SET PIN SERIAL | SPS |
| 1 | 0 | 1 | 0 | SET DISCONNECT | SD |
| 1 | 0 | 1 | 1 | SET CLOCK 1 | SC1 |
| 1 | 1 | 0 | 0 | TEST (SPARE) | |
| 1 | 1 | 0 | 1 | TEST TESTER | TT |
| 1 | 1 | 1 | 0 | TEST SERIAL | TS |
| 1 | 1 | 1 | 1 | TEST PARALLEL | TP |

SET UP (SU) MODE OPERATIONAL CODES CONTAIN $\bar{a}$
TEST (T) MODE OPERATIONAL CODES CONTAIN ab

FIG. 10

ELECTRONIC TESTER FOR TESTING DEVICES HAVING A HIGH CIRCUIT DENSITY

BACKGROUND OF THE INVENTION AND PRIOR ART

The present invention relates generally to electrical equipment and particularly to a test apparatus for testing the operation of signal-processing devices such as, but not limited to integrated circuits fabricated by Large Scale Integration (L.S.I.) techniques.

By Large Scale Integration techniques a great number of circuits, including a great number and variety of components are fabricated on a single chip of semiconductor material. LSI techniques have been further facilitated by the development of Metal Oxide Silicon (MOS) and Metal Thick Oxide Silicon fabrication techniques.

These processes enable the system designer to package a great number of circuits in a relatively small volume. These circuits have the significant advantages of operating at low levels of power dissipation and at high operating or switching rates. As a result LSI circuits have found wide acceptance, for example, as logic and memory circuits in digital computer systems and the like. The reliability of such systems depends greatly on the reliability and accuracy of operation of the component circuits, and thus a need has arisen for new and sophisticated equipment and procedures for more efficiently testing LSI circuits. Such testing is difficult because of the great number of difficult functional sections in each circuit, and because of the many different operating parameters which must be checked. To completely evaluate the operation of a given circuit it must be subjected to both static and dynamic tests and measurements. These tests include leakage tests, power tests, and functional tests, the latter being particularly useful in the testing of logic circuits to determine whether or not the circuit being tested performs its desired logic operation upon an input signal. In a functional test, which may be either combinational or sequential, a known signal is applied to one or more of the circuit inputs, and the actual circuit output signal is checked to determine whether it conforms to the output signal that the circuit should correctly produce in response to the specified input signal. In the performance of these tests, it is desirable that the circuit be operated at, and/or near its normal operating conditions with respect to load, power supply, and in the case of a logic circuit, clock signals.

It is thus apparent that an apparatus for testing LSI circuits must be able to develop and analyze a large quantity of data and test signals. Moreover, the test system should be operable over a wide range of signal frequencies which are commonly used in the operation of LSI circuits. For a test apparatus to be able to satisfy the requirements for use with the vast number of LSI circuits presently and in the future available, it must be able to perform many hundreds of tests, where each test may utilize very many thousands of bits of information. Hence it is apparent that the storage requirements of the state the art testers are sizeable and will increase in the future. As fully disclosed and described in detail hereinafter, applicant's invention materially reduces these storage requirements in an efficient, effective manner and provides a more efficient more rapidly operating tester.

In prior art testers a computer exercises primary control over the test system and establishes the test sequence and parameters according to an operational test program. Each pin of the device under test has its own pin electronic circuit. Where the device under test has *n* pins, *n* pin electronics circuits, or cards, are required.

Binary words each having n binary bits are successively impressed on said pin electronics cards. Whereby each of said *n* pin electronics cards receives a logic "zero" electrical manifestion or a logic "one" electrical manifestation, as called for by the test program, for each of said successive binary words. Blocks of *n* binary-bit words are transferred, under control of a system controller, from a bulk store (large memory) to a word oriented high speed Random Access Memory (RAM). Under control of the system controller and decode circuitry the *n* bit binary words are, each during a discrete time period, applied to said *n* pin electronics circuits. Each pin electronics circuit includes switches interconnecting analog to digital conversion circuitry and digital to analog conversion circuitry. The switches of each pin electronics circuit card are controlled by said system controller and Decode circuitry to provide any one of at least the following circuit functions: driver, detector, load, power supply, ground and open circuit. Thus the setting of the switches in the pin electronic circuits together with the electrical manifestation (logical one, or logical zero) impressed on the input of the pin electronic circuits, dictates the electrical characteristics and magnitude of the electrical manifestations impressed on the associated pins of the device under test.

In summary, in response to the application of each of said *n* binary bit words on said *n* pin electronics circuits, and under control of said operational test program, each of said n pins of the device under test will be subjected to an electrical manifestation or the absence of an electrical manifestation in accordance with its function. For example, the logical input pins will receive an electrical manifestation of a logical one or an electrical manifestation of a logical zero as called for by the test program, the power supply pins will receive a voltage forcing or current forcing electrical manifestation as called for by the test program, the load pins will be subjected to an appropriate electrical load as called for by the test program, the output pins will be conditioned to receive an output from the device under test as directed by the test program, etc.

The tester further contains circuitry, which may be in the n pin electronic circuits and/or system controller for accepting, in response to each of said n-binary bit words, an output from the output pins of the device under test and comparing it with a known standard.

It is to be appreciated that the above description of testers is subject to considerable variation in structure and mode of operation. The art is, and has been for some time developing very rapidly. Merely by way of example, it will be apparent that the technique employed to set-up the pin circuits may take any one of many forms. For example, it may be accomplished more or less exclusively by decode type circuitry, by the system controller jointly with decode type circuitry, or by the system controller directly and alone. Further the n pin circuits need not be identical. Certain of said pin circuits may be capable of performing functions that others of said pin circuits are not capable of performing. As will be seen and appreciated more fully from the hereinafter detailed description of applicant's invention, the practice of applicant's invention is not limited to a particular tester structure, nor to a particular technique of conditioning the pin circuits, or comparing the output of the device under test with a known standard and storing, manifesting, and/or analyzing the result of said comparison.

SUMMARY INVENTION

Many Large Scale Integration Devices and structures containing a plurality of interconnected Large Scale Integration Devices require test patterns that are a mix of serial and parallel data. For example, parameter and set-up data is applied to all Device Under Test (DUT) Pins in parallel. Primary DUT I/O pins feeding combinatorial and random sequential logic also require parallel application of test data. However when shift register structure, counter structure, sequential latch structure, and/or any structure having time sequential characteristics exist in the device or structure under test, long serial chains of data must be applied to a single pin, or a limited number of pins, between applications of parallel data. This is what will be referred to as Mixed-Serial-Parallel (MSP) Testing. Mixed-Serial-Parallel test patterns are employed by the logic structure, and testing methods disclosed and claimed in the following United States Patent Applications filed in the name of Edward B. Eichelberger, and each of common assignee herewith: Ser. No. 297,543, entitled "Level Sensitive Logic System," filed Oct. 13, 1972 granted as U.S. Pat. No. 3,783,254 on Jan. 1, 1974; Ser. No. 298,071 entitled "Method of Propagation Delay Testing a Functional Logic System," filed Oct. 16, 1972 granted as U.S. Pat. No. 3,784,907 on Jan. 8, 1974; and Ser. No. 298,087, entitled "Method of Level Sensitive Testing a Functional Logic System," filed Oct. 16, 1972 granted as U.S. Pat. NO. 3,761,695 on Sept. 25, 1973.

Mixed Serial Parallel tests are also employed by the Electronic Tester and Test Method disclosed and claimed in U.S. Pat. application Ser. No. 394,712 by Michael J. Patti filed Sept. 6, 1973, entitled "Method and Apparatus for Testing High Circuit Density Devices," and of common assignee herewith.

The invention disclosed and claimed herein is directed to the testing of high circuit density electronic devices such as devices fabricated by large scale integration techniques. In particular to testers employing a word oriented Random Access Memory (RAM), or the equivalent, to store test patterns. In testers of this type the test patterns include a large number of words, each word consisting of a sizeable number of binary bits. The invention is more specifically directed to efficiently utilizing the storage capacity of the RAM where a number of successively employed words in a test pattern differ randomly in data in any one, or at most a limited number, of binary bit positions. Where $n$ words constituting, or contained within, a test pattern, differ in data in a particular binary bit position, or only a limited number of binary bit positions, only the first to be employed of said $n$ words will be stored in the RAM. The remaining $n-1$ of said $n$ words will be represented in said memory by a binary word, or successive binary words, including in prescribed sequence the binary information bits of said $n-1$ words corresponding to the binary bit positions where said $n$ words randomly differ.

The invention discloses binary word reconstruction means cooperating with the RAM for accepting the first of said $n$ words and successively reconstructing said $n-1$ of said $n$ binary words.

The preferred embodiment of the invention provides for the successive reconstruction of said $n-1$ words by employing high speed circulating shift register means and supporting storage and control circuitry means. Where said $n$ words differ in information in only one binary bit position $y$, only one complete word of said $n$ words will be stored in the RAM. The remaining $n-1$ of said $n$ words will be represented and stored in said memory by a word, or words, $x$, including, in a prescribed sequence, the binary information bits of said $n-1$ words corresponding to the one binary bit position, $y$, wherein said $n$ words randomly differ. The shift register initially accepts from the RAM the complete one of said $n$ words. The shift register then conveys, in parallel, said one of said $n$ words to latch means contained within the $n$ pin circuits. Thereafter the shift register accepts the word, $x$, in parallel and provides a serial by bit output at a register position corresponding to the said binary bit position, $y$, of said $n$ words. The pin circuit of said binary bit position $y$ successively accepts said serial by bit output. The parallel to serial conversion of the word $x$, together with the stored word, accomplishes the successive reconstruction of said $n-1$ words. Thus it is apparent that each of said $n$ words is available for testing a device under test (D.U.T.).

A primary object of the invention is to provide an improved electronic tester for testing an electronic structure having high circuit density, such as large scale integration devices, structures and subsystems having a plurality of interconnected large scale integration devices, and the like.

A further object of the invention is to provide an improved large scale integration device tester having an improved architecture whereby mixed serial/parallel tests are more efficiently and rapidly performed.

A further object of the invention is to provide an improved large scale integration device tester architecture having novel and more efficient structure for the active storage and execution of mixed serial/parallel tests.

A further object of the invention is an improved electronic tester for more efficiently and rapidly testing high circuit density electronic devices requiring substantial testing by mixed Serial/Parallel Test data.

A further object of the invention is the provision of a word reconstruction means for use with a memory, whereby a plurality of predetermined distinct words may be rapidly and efficiently constructed exclusively from a single word and a plurality of word portions stored in said memory.

A still further object of the invention is an improved electronic tester employing a test pattern and having a memory and additional means including shift register means coupled to said memory, whereby only a portion of said test pattern is stored in said memory, and said additional means including said shift register means, in cooperation with said memory, provides a full and complete predetermined test pattern.

A still further object of the invention is to provide an improved pin circuit for use in a high speed electronic tester.

A still further object of the invention is an improved pin circuit for use in a high speed electronic tester employing binary word reconstruction means.

A still further object of the invention is to provide an improved high speed shift register.

A still further object of the invention is an improved shift register for use in conjunction with a memory to accomplish binary word construction.

A still further object of the invention is an operational code oriented tester allowing efficient, high speed "SET-UP" changes of the tester during test execution.

The architecture of prior art Large Scale Integration testers does not make any special provision for the active storage and execution of mixed Serial/Parallel Tests. Hence as will be more apparent hereinafter applicants improved testers is materially more efficient and faster in operation than testers of the prior art where the test data is primarily, substantially, or at least partially, mixed Serial/Parallel in character. Applicant's invention includes the modification of the architecture of a Large Scale Integration tester to maximize utilization of active storage of mixed Serial/Parallel test data and accomplish efficient rapid testing of Large Scale Integrated Devices.

BRIEF DESCRIPTION OF THE DRAWINGS

FIG. 4 discloses a block diagram of the shift register means employed in the preferred embodiment;

FIG. 5 discloses a logical block diagram of a single stage of the Shift Register means of FIG. 4;

FIG. 6 discloses a logical block diagram of the pin circuit employed in the preferred embodiment;

FIG. 7 discloses a logical block diagram of the hazard free polarity hold latch employed in the Shift Register means of FIG. 4 and the Pin Circuit of FIG. 6;

FIG. 8 discloses a logical block diagram of the Decode Circuitry employed in the preferred embodiment;

FIG. 10 is a tabulation setting forth the operational codes utilized by the preferred embodiment.

Referring to FIG. 1, a brief discussion of generally conventional LSI tester architecture will be undertaken as an aid to the understanding of applicant's invention.

FIG. 1 is a block diagram schematically representing the data flow in a typical prior art tester for testing a device having n pins, P1 through PN. The n pin electronic circuits PE1 through PEN are respectively associated with pins P1 through PN. Each pin electronic circuit includes the digital to analog circuits for driving the device under test, analog to digital circuits for detecting the device under test outputs and registers for holding the status of each of the pins. Each of the pin electronic circuits includes switches controlled by signals on leads 5. The switches activate circuits within the pin electronics circuit in accordance with the function to be performed thereby, such as driver, detector load, power supply, ground and open circuit. It will be appreciated that during any perticular test step certain pin electronic circuits will be performing a driver function, while others of said pin electronic circuits will be performing an output function, while still others of said pin electronic circuits may respectively be performing the functions load, power supply, ground and/or open circuit.

Figure 1:
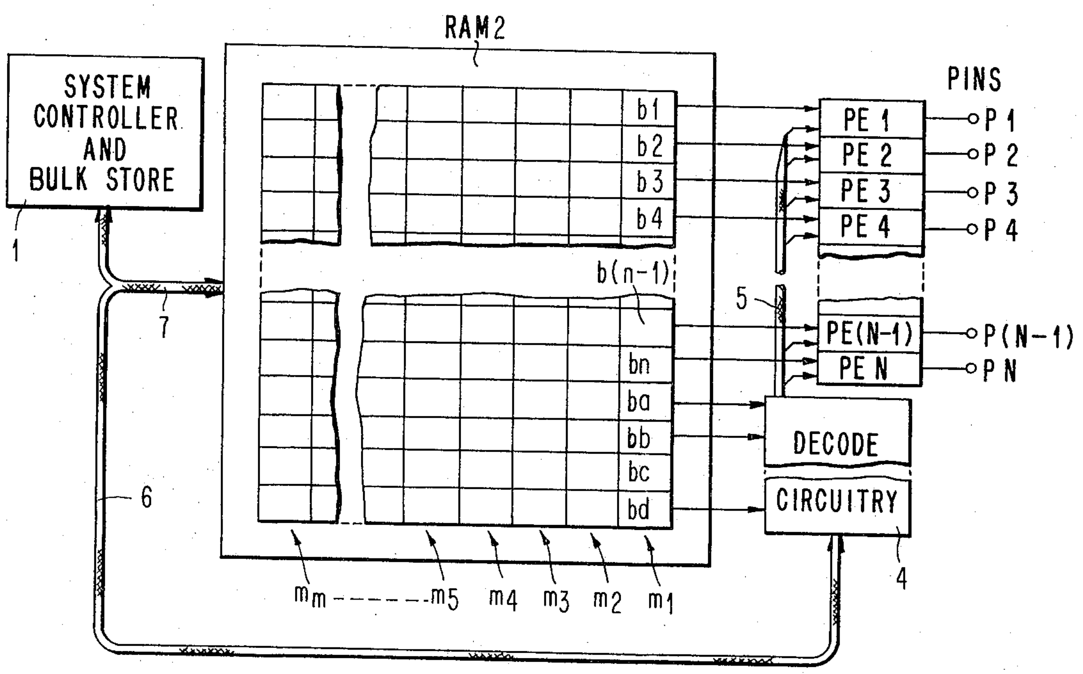
FIG. 1 is a block diagram schematically representative of conventional L.S.I. tester architecture.

Still referring to FIG. 1 it will be seen that $m_1$ through $m_m$ word positions are diagrammatically represented as contained within RAM 2. It will also be seen that each of said m words is diagrammatically shown to have $n +$ 4 bit positions. The bit positions of each of said m words are denoted in FIG. 1 by reference characters *b*1, *b*2, *b* 3----*bn*, *ba*, *bb*, *bc*, *bd*. The four binary bits contained within bit positions *ba*, *bb*, *bc*, and *db* of each of said *m* words are coupled to and utilized by the Decode circuitry 4. These bits of each word are decoded by the Decode circuitry and under control of the System Controller provide appropriate signals on leads 5 for controlling and designating the function of each of said, PE 1 through PE n pin electronic circuits. The n bits of each word provide each of the PE 1 through PE *n* pin electronic circuits with a logical one, or logical zero, electrical manifestation as called for by a test pattern, under control of a test program.

The Controller and Bulk Store 1 may be a computer system. It may be any one of a number of commercially available computer systems. One suitable commercially available system is the IBM System 7. The Controller and Bulk Store 1 exercises primary control over the system and establishes the test sequence and parameters according to an operational test program prepared by a programmer. The preparation of test programs and associated test patterns is a highly developed art and is being actively pursued at this time. Numerous suitable test programs and patterns are available to practice applicant's invention. The preparation and generation of test programs, and test patterns, "per se" is not a part of applicant's invention. The test program includes at least one test pattern having a number of test steps. Each step of a test pattern includes a sizeable number of binary bits.

In the illustrative structure schematically shown as in FIG. 1 the m binary words will for convenience be referred to as a test pattern. It will be appreciated by those skilled in the art that the term "test pattern" as employed and defined in the art may include various test data in addition to a sizeable number of binary words each having a large number of binary bits. Each of the afore-identified *m* binary words of FIG. 1 contain *n* +4 binary bits. As stated above, for convenience of explanation, the binary bit positions are designated as *b*1, *b*2, *b*3, *b*4----*bn*+1, *bn*, *ba*, *bb*, *bc*, and *bd*.

In the illustrative structure of FIG. 1 the test patterns contains m word. One of said words is employed for each of *m* test steps. Each word contains four binary bits within bit positions *ba*, *bb*, *bc*, and *bd*. These four binary bits are decoded by Decode circuitry 4 and under control of signals on leads 6 from the System Controller and Bulk Store 1 provide signals on leads 5. The signals on leads 5 instruct and specify to each pin electronic circuit what function it is to perform.

Stated in a different manner the four bits contained within bit positions, *ba*, *bb*, *bc*, *bd* are decoded and tell the Pin Electronic Circuits how to interpret the *n* bits contained within bit positions *b*1, *b*2 through *bn*. The four bits provide $2^4$, or sixteen, discrete electrical manifestations. The four bits for convenience may be referred to as operational code specifying bits. Testers known to the art may employ more or less than four operational code specifying bits. It will also be appreciated that the discrete electrical manifestations available to be impressed on leads 5 may be more or less than sixteen.

Typical operations specified by the operational code specifying bits are:

a. test normally; (b) set up input pins c. set up output pins; (d) mask outputs e. change I/0-----etc.------through sixteen operational codes.

A not untypical sequence of test steps may be as follows:

Set up Pin Electronic circuits. Namely set the appropriate pin electronic registers for each of the pins that are to be employed as inputs; set the appropriate pin electronic registers for each of the pins that are to be employed as outputs; and so on as to the remaining pin circuits and their respective functions. Note: During each test step where test data is applied to the pin circuits, each pin circuit associated with a pin of the device under test will be in the condition required to perform its function. This conditioning will have taken place prior in time to application of test data in the form of electrical manifestations of logical ones and zeros to the pin circuits. It will be appreciated that certain pin electronic circuits may not have a function to perform during one or more test steps. These non-performing pin electronic-circuits will have been appropriately conditioned, or de-conditioned. The pin circuits having been set up to perform their respective functions, each of said pin circuits will simultaneously have impressed thereon an electrical manifestation of either a logical one or a logical zero as dictated by the test pattern step. The output of the device under test will be received by certain of the pin electronic circuits. This output will be compared to a known standard, or Expected Result. The output from each output pin of the device under test will be compared with an expected good output from that output pin under the conditions of the particular test step. This comparison may take place in the pin electronics circuits and the result (Pass/Fail) electrically manifested and conveyed to the System Controller and Bulk Store 1, over cable leads 5 and 6. Thus it is apparent that the Pass/Fail data for each output pin of the device under test, for each test step is available for storage, processing and/or analysis by the System Controller and Bulk Store 1. The sequence of additional test steps may be as follows: During each subsequent test step a successive one of said *m* binary words is impressed on the inputs of said *n* pin circuits and the operational code specifying inputs of said Decode circuit. Assume for convenience of explanation that the subsequent test steps are one thousand in number. During each of said subsequent test steps a successive one of said *m* binary words will be impressed on the inputs of said *n* pin circuits and said inputs of the Decode Circuit. Further assume for purposes of explanation that the operation code specifying bits of each of said subsequent steps calls for "Test Normal, " and thereby no change, or modification, in the respective functions of each of the n pin circuits is called for. The word oriented Random Access Memory 2 will successively apply, one during each test step, a successive one of said *m* words on said aforeidentified input terminals. During each said test steps Pass/Fail data for each ouput pin of the device under test is made available for storage, processing and/or analysis by the System Controller 1. It will also be apparent that Pass-/Fail data may be outputted by the System Controller in a form suitable for human inspection and/or analysis. Where the capacity of the RAM is not adequate to store a complete block of m words, the System Controller will periodically transfer portions of said block of *m* words from Bulk Storage to the RAM.

It is now to be further assumed for purposes of explanation that the device under test is an integrated circuit having a circuit density of five thousand interconnected components and contains a shift register type structure requiring a periodic input of logical ones and zeros on input pin *Pn*–70 during test steps 1 through P-7, where P is the integer one hundred seven. Further assume *n* is equal to two hundred and that during said 1 through P-7 test steps the logical ones and zeros respectively impressed on said n input pins, with the exception of input pin *n*-70, are invariant. It will be apparent that one hundred of said p words are identical, except for bit position $b_{n\text{-}70}$. As assumed earlier, *p* is equal to 107 and *n* is equal to 200. The storing of said 1 through *p*-7 test words, namely one hundred words, each having 200 bits requires (100×200) twenty thousand bit positions. In actuality more than twenty thousand bit positions are required, since no storage provision for the operational code specifying bits has been provided in the above calculation. Assume that four ($2^4 = 16$) operational code specifying bits per test word are required, then [(100) (200+4)=20,400] twenty thousand eight hundred bit positions of storage are required. As will be appreciated, under the assumed conditions of this example, the operational code specifying bits call for test normal for each of said 1 through P-7 words.

As will be explained in more detail hereinafter applicants's invention is a modification in the architecture of known and commercially employed testers. The architectural modification includes the provision of word reconstruction means coupling a memory, such as word oriented Random Access Memory, to the pin circuits of the tester. The use of word reconstruction means has, as one primary advantage the material reduction of the storage requirements.

Making reference to the prior example the use of word reconstruction means will permit the construction of said 1 through *p*-7 words from a store containing only one, or only the first of said 1 through *p*-7 words, and a single discrete bit corresponding to each of said remaining 1 through *p*-7 test words. Further only a single four bits of operational code specifying data need be stored.

Referring back to the illustrative example utilizing p words each of which has two hundred bits, assume that the $p$-5th word has operational code specifying bits associated therewith that specify "Mask Outputs." This operational code namely "Mask Outputs" will, depending on the architecture of the tester, cause the tester to assume the "set-up mode " or the "test mode." In the set-up mode, each of said n pin circuits receiving a logic one from the RAM is set to the status indicated by the operational code. The pin circuits receiving a logic zero do not change. Correspondingly the architecture of the tester may be such that the operational code Mask Outputs is executed in the test mode whereby the output from predetermined ones of the output pins of said devices under test are masked. The masking of an output from a pin, as desired, results in the ignoring of the output of that particular output pin.

Figure 2:
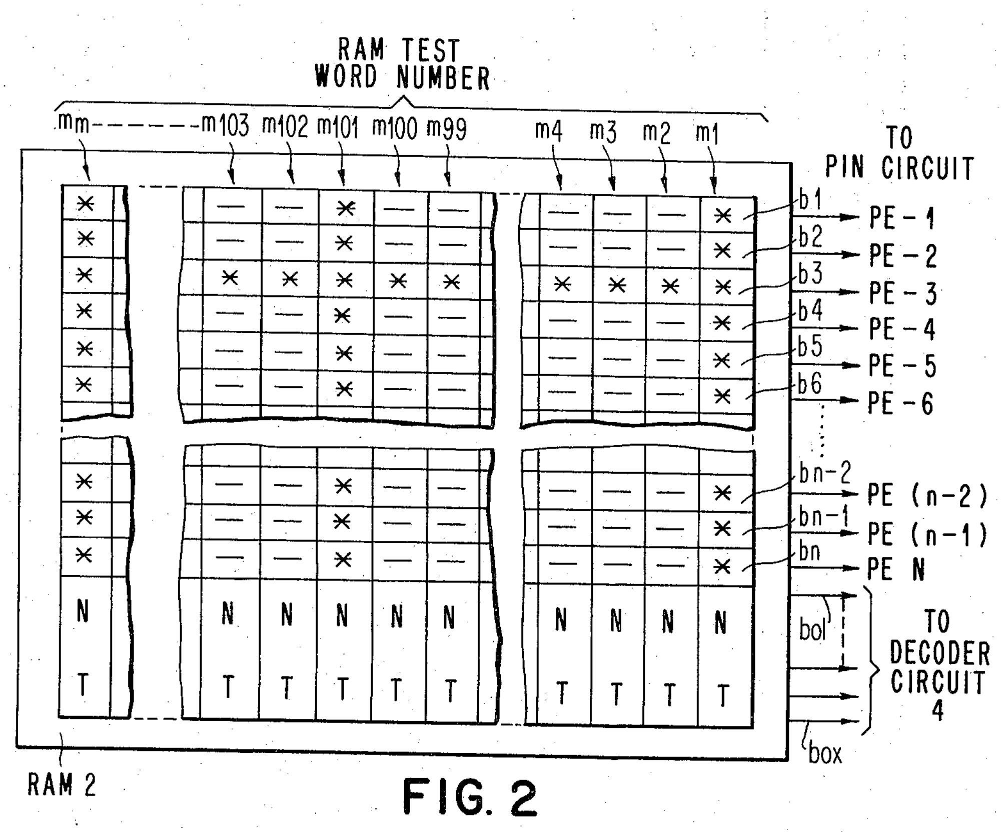
FIG. 2 schematically depicts an illustrative test data pattern stored within a word oriented random access memory as employed in the conventional L.S.I. tester shown in FIG. 1.

The problem with conventional tester architecture when the test pattern contains mixed serial/parallel test data will be further and specifically illustrated with reference to FIG. 2. FIG. 2 schematically illustrates what will for convenience be termed a test data map or test data pattern stored within a RAM. The data map contains $m$ words, namely $m_1$ through $m_m$. Each of said m words contain $n + x$ bits positions. M is any integer from 100 to 2000 or more, $n$ is any integer from 100 to 200 or more. X is any integer from four to ten or more. The $b01$ to box bit positions contain the operational code specifying bits. Depending on the architecture of the tester as few as four operational code specifying bits may be employed, or as many as ten, or more.

It will be noted from FIG. 2 that the bit positions of each of said $m$ words contains bit positions $b1$, $b2$, $b3$----$b(n-2)$, $b(n-1)$, $bn$ and $b01$, $b02$---$b0(x-1)$, box. In this illustrative example the pin circuits PE-1 through PE-N have already been set-up, namely each pin circuit has been conditioned to perform its required function. The operational code specifying bits for each of said $m$ words specifies normal test, as represent by N.T. in bit positions b01 through box of each word. The test data represented is mixed serial/parallel where an asterisk (*) represents the storage of either a logical one, or a logical zero in the bit position containing the asterisk and a dash (−) represents a useless or redundantbit.

During each successive test steps, a successive one of said test words, $m_1$ through $m_m$, is applied to the pin circuits and decode circuit 4. Namely, test word $m_1$ is applied during test step 1. Test word $m_2$ is applied during test step 2; test word $m_3$ is applied during test step 3, and so on through test word $m_{100}$ being applied during test step 100.

Still referring to FIG. 2 and specifically test words $m_1$ through $m_{100}$, it will be seen that pin circuits PE1 through PEN each receive test data, namely an electrical manifestation of either a logical one or a logical zero during test steps 1 and 101, respectively, as called for by the test pattern, and that during test steps 2 through 100, respectively, only pin circuit PE3 receives an electrical manifestation of a logical one or logical zero as called for by the test pattern. During each said one through one hundred one test steps the operational code specifying bits specify normal testing, as represented by N.T. in FIG. 2.

Thus in the example illustrated in FIG. 2 pin circuit PE3 receives a serial test data string ninety-nine data bits long (test steps 2 through 100) between the parallel data tests (test steps 1 and 101) in which each of said $n$ pin circuits PE1 through PEN receives a data bit. This condition is represented in FIG. 2 by bit positions b1 through $bn$ of word $m_1$, bit positions $b1$ through bn of word $m_{101}$ and bit positions $b3$ of words $m_2$ through $m_{100}$, each containing an asterisk (*), and bit positions $b1$, $b2$, and $b4$ through $bn$ of words $m_2$ through $m_{100}$ containg a dash (-).

In the example of FIG. 2, ignoring the storage requirement of the operational code specifying bits, it will be apparent that the storage capability of the RAM is very inefficiently employed in testers employing prior art architecture. For example, still ignoring the storage requirements of the operational code specifying bits, where $n$=100, ten groups of serial-parallel data each group consisting of 100 words, requires 100,000 bit positions of storage.

Namely:

(100) × (100) × (10) = 100,000
(bit positions) per word × (words) per group × (no. of) groups = No. of RAM bit positions required.

However, as will be appreciated from the example of FIG. 2 only 1,990 of these 100,000 bit positions are utilized.

Namely:
10 × (100 + 99) = 1990-No. of RAM bit positions utilized.
99 — each group has ninety-nine words each containing a single bit
100 — each group has one word containing one hundred bits
10 — ten groups Therefore, ignoring any requirement for operational code specifying bits, less than 2 percent of the RAM storage capacity is utilized.

Namely,

1990/100,000 or 1.99 percent.

As will be fully apparent from the more detailed description of applicant's invention set forth hereinafter, the practice of applicant's invention results in approaching, if not attaining, one hundred per cent utilization or RAM storage capability. Thus for a given test requirement of the prior art a smaller RAM may be employed, or a much larger test map may be executed.

Figure 3:
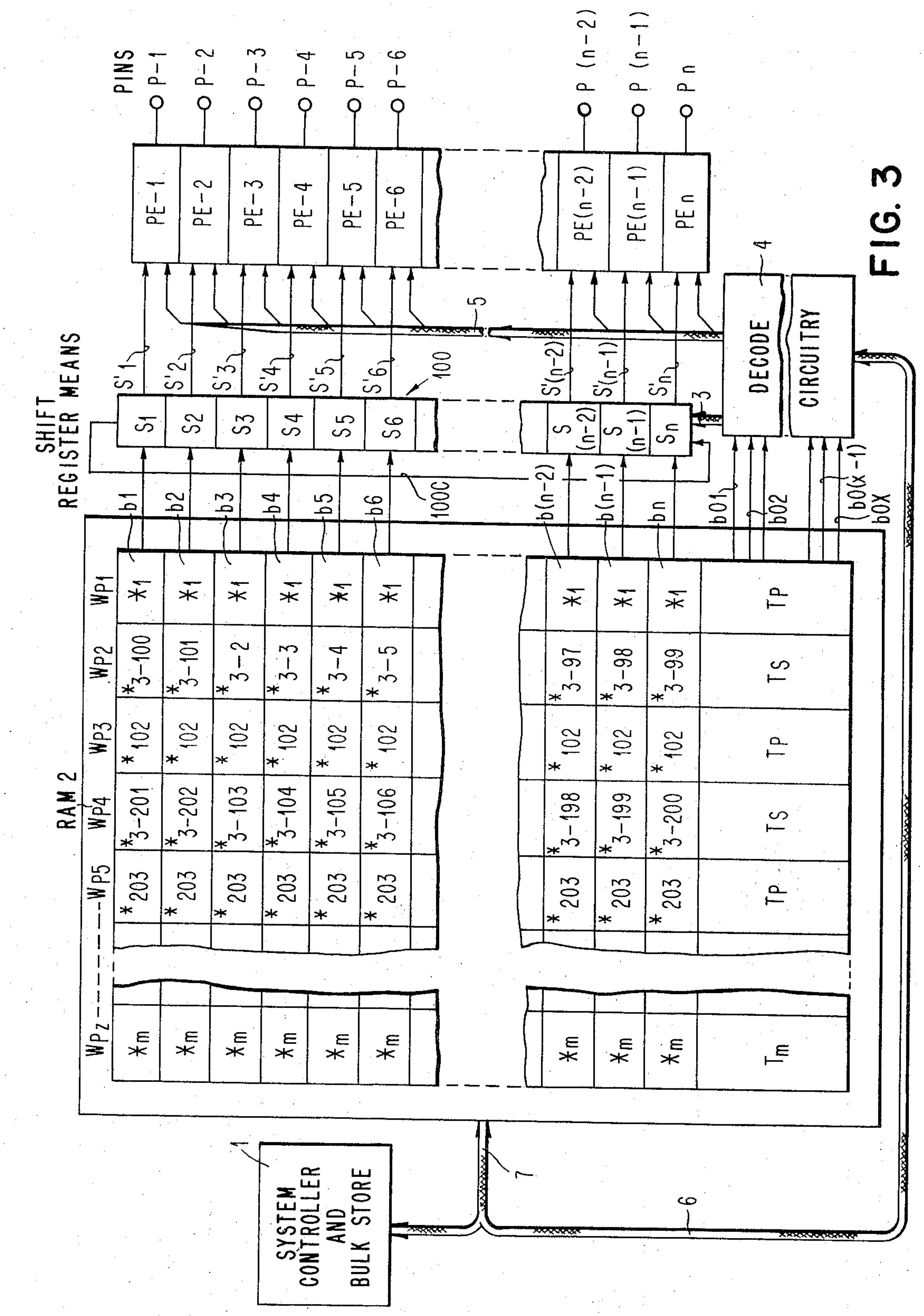
FIG. 3 schematically discloses an illustrative embodiment of applicant's high speed tester for testing high circuit density devices.

Referring to FIG. 3, an illustrative embodiment of applicant's invention is disclosed. System Controller and Bulk Store 1 is coupled to RAM 2 via cable leads 7, and to Decode circuitry 4 by cable leads 6. Decode circuitry 4 is coupled to closed loop Shift Register 100 by cable leads 3 and to Pin Electronic circuits PE 1 through PE N by cable leads 5. Shift Register 100 is coupled between the output of RAM 2 and the inputs of pin circuits PE 1 through PE N.

RAM 2 is a word oriented Random Access Memory having word positions, or word addresses, $W_{pl}$, $W_{p2}$, $W_{p3}$, $W_{p4}$, $W_{p5}$,------$W_{p(z-2)}$, $W_{p(z-1)}$, and $W_z$, where z is an integer of multiple hundreds in magnitude, for example four hundred or more. Each word position of RAM 2 has bit positions $b_1$, $b_2$, $b_3$, $b_4$, $b_5$, $b_6$ ----$b_{(n-2)}$, $b_{(n-1)}$ and $b_n$, and operational code specifying bit positions, $b_{01}$, $b_{02}$, ---$b_{0(x-1)}$, $b_{0x}$.

Shift Register 100 is a high speed multi-bit position closed loop circulating register having bit positions $s_1$, $s_2$, $s_3$----$s_{n-2}$, $s_{n-1}$ and $s_n$. Each bit position of register 100 has an input adapted to receive an input from a bit position of RAM 2 and provides an output to the input of a pin electronic circuit. From FIG. 3 it will be seen that: bit position $s_1$ of register 100 is coupled between bit position $b_1$ of RAM 2, and via lead $s_1$ to pin circuit PE 1; bit position $s_2$ of register 100 is coupled between bit position $b_2$ of RAM 2, and via lead $s'_2$ to pin circuit PE 2; --- ---- -- -----; bit position $s_{(n-1)}$ of register 100 is coupled between bit position $b_{(n-1)}$ of RAM 2, and via lead $s'_{(n-1)}$ to pin circuit PE–($n$−1); and bit position $s_n$ of register 100 is coupled between bit position $b_n$ of RAM 2 and via lead $s'_n$ to pin circuit PE-N. Shift Register 100 has a closed loop, or connection 100C between register stage (bit position) $s_1$ and register stage (bit position)$s_n$. The Shift Register 100 is a high speed unidirectionally or bi-directionally shiftable storage medium, under control of signals, via leads 3, from Decode circuitry 4. The register is adapted to shift data in a clockwise, or counter clockwise direction, as viewed in FIG. 3. The Shift Register 100 is further controllable to accept an $n$-bit binary word, in parallel, from RAM 2 and, in parallel, impress said n bit binary word on the pin circuits PE-1 through PE-N. Shift Register 100 is still further controllable to accept an $n$-bit binary word in parallel from RAM 2 and provide a serial by bit output from any one of said $s_n$ stages.

Numerous suitable high speed multi-bit binary unidirectional, or bi-directional shift registers, or storage mediums, are known in the art and may be employed to practice applicant's invention.

In FIG. 3, RAM 2 is schematically represented to contain stored binary test data, namely the storage of electrical manifestations of logical ones and/or logical zeros. Each asterisk denotes the storage of a logical one or a logical zero. The numerical subscript associated with each asterisk is utilized hereinafter in conjunction with an example to explain the operation of the tester of FIG. 3.

The operational code specifying bit positions of each word position of the RAM 2 are coupled to Decode Circuitry 4. These bit positions are denoted by reference characters $bo1$, $b_{o2}$----$b_{o(x-1)}$, and $b_{ox}$, and serve essentially the same general function described earlier herein.

Still referring to FIG. 3, the operation thereof will be explained with the aid of an example. This example, as well as all examples set forth herein, is not intended to be, nor should it be construed to be, exhaustive, or fully representative, of the utility of applicant's invention.

Referring to RAM 2 of FIG. 3 a test pattern, or portion of a test pattern having $m$ words, each word having $n$ binary bits is represented as stored therein in a manner in accordance with the teachings of applicant's invention. Each of said $m$ words will be employed during a discrete one of $m$ test steps. It is further to be noted that a sizeable portion of the test pattern, or portion of a test pattern stored in RAM 2, as shown in FIG. 3 is mixed Serial/Parallel test data in character.

The test data stored in RAM 2, in accordance with the example, has one hundred binary bits per word, namely, $n$= 100. The test data is a test pattern, or a portion of a test pattern, having m words. RAM 2 is illustrated as having $z$ word storage positions, or word addresses. $m$ and $z$ are respectively integers and $z$ is materially less than $m$.

Table 1 is a tabulation showing a storage arrangement technique for storing mixed Serial/Parallel test data in a word oriented Random Access Memory in accordance with the teaching of applicant's invention. Table 1 is a tabulation of the data represented as stored in RAM 2 of FIG. 3. The contents of table 1 will be fully apparent from the description following the table. It will be sufficient at this point to merely clarify the notation utilized in Table 1. The asterisks (*) each represent the storage of a logical one electrical manifestation, or a logical zero electrical manifestation. Where a word position of RAM storage contains one complete test word the subscript to the asterisk designates the test word number. Where a word position of RAM storage contains bits from a number of test words the hyphenated subscript designates the test word bit position and the test word number.

For purposes of explanation attention is directed to the left hand column of Table 1, entitled, Word Bit Position in RAM, Bit Position. Under this column go to bit position $b_5$, now proceed to the right under the column head Word Position No. 2 in RAM and the notation "*3–4($b_3$,$m_4$)" is set forth. This notation shows that the binary bit (*) for bit position 3 of test word $m_4$ is stored at this bit location in the RAM, namely word position 2, bit position 5.

Correspondingly, still referring to Table 1 the notation "*3–200 ($b_3$,$m_{200}$)", and the position thereof in Table 1 denotes that the binary bit (*) for bit position 3 of test word $m_{200}$ is stored in the RAM at bit position $b_n$ ($b_{100}$, where $n$ = 100) in word position 4.

TABLE 1

Illustrated Example of Data Storage Technique of Test Words in RAM 2 of FIG. 3

| Word Bit Position in RAM | Word Position No. 1 in RAM | Word Position No. 2 in RAM | Word Position No. 3 in RAM | Word Position No. 4 in RAM | Word Position No. 5 in RAM | Word Positions 6 through z-1 in RAM | Word Position No. 2 in RAM |
|---|---|---|---|---|---|---|---|
| Bit Position | Wp1 | Wp2 | Wp3 | Wp4 | Wp5 | — | Wpz |
| $b_1$ | *1 | *3–100 | *102 | *3–201 | *203 | | *m |
| | $(b_1,m_1)$ | $(b_3,m_{100})$ | $(b_1,m_{102})$ | $(b_3,m_{201})$ | $(b_1,m_{203})$ | — | $(b_1,m_m)$ |
| $b_2$ | *1 | *3–101 | *102 | *3–202 | *203 | | *m |
| | $(b_2,m_1)$ | $(b_3,m_{101})$ | $(b_2,m_{102})$ | $(b_3,m_{202})$ | $(b_2,m_{203})$ | — | $(b_2,m_m)$ |
| $b_3$ | *1 | *3–2 | *102 | *3–103 | *203 | | *m |
| | $(b_3,m_1)$ | $(b_3,m_2)$ | $(b_3,m_{102})$ | $(b_3,m_{103})$ | $(b_3,n_{203})$ | — | $(b_3,m_m)$ |
| $b_4$ | *1 | *3–3 | *102 | *3–104 | *203 | | *m |
| | $(b_4,m_1)$ | $(b_3,m_8)$ | $(b_4,m_{102})$ | $(b_3,m_{104})$ | $(b_4,m_{203})$ | — | $(b_4,m_m)$ |
| $b_5$ | *1 | *3–4 | *102 | *3–105 | *203 | (May contain serial and/or parallel test data) | *m |
| | | | | | | | $(b_{,m,mm})$ |
| . | $(b_5,m_1)$ | $(b_3,m_4)$ | $(b_5,m_{102})$ | $(b_3m_{105})$ | $(b_5,m_{203})$ | | |
| . | . | . | . | . | . | | . |
| . | . | . | . | . | . | | . |
| | . | . | . | . | . | | |

TABLE 1 – Continued

Illustrated Example of Data Storage Technique of Test Words in RAM 2 of FIG. 3

| Word Bit Position in RAM | Word Position No. 1 in RAM | Word Position No. 2 in RAM | Word Position No. 3 in RAM | Word Position No. 4 in RAM | Word Position No. 5 in RAM | Word Positions 6 through z-1 in RAM | Word Position No. 2 in RAM |
|---|---|---|---|---|---|---|---|
| $b_{n-2)}$ | *1 $(b_{n-2},m_1)$ | *3–97 $(b_3,m_{97})$ | *102 $(b_{n-2},m_{102})$ | *3–198 $(b_3,m_{198})$ | *203 $(b_{n-2},m_{203})$ | — | *m $(b_{n-2}m_m)$ |
| $b_{n-1)}$ | *1 $(b_{n-1},m_1)$ | *3–98 $(b_3,m_{98})$ | *102 $(b_{n-1},m_{102})$ | *3–199) $(b_3\ ,m_{199})$ | *203 $(B_{n-1},m_{203})$ | — | *m $(b_{n-1},m_m)$ |
| $b_n$ | *1 $(b_n,m_1)$ | *3–99 $(b_3,m_{99})$ | *102 $(b_n,m_{102})$ | *3–200 $(b_3,m_{200})$ | *203 $(b_n,m_{203})$ | — | *m $(b_nm_m)$ |

Referring jointly to FIG. 3 of the drawing and Table 1 it will be seen that word position No. 1 ($W_{p1}$) of RAM 2 stores word $m_1$ of test data. The binary bits (logical one or logical zero) of each bit position in word $m_1$ are represented by an asterisk with a subscript 1 ($*_1$).

Word position No. 2 ($W_{p2}$) of RAM 2 stores n binary bits. Each of said binary bits reading from bit position $b_1$ through $b_n$ of word position $W_{p2}$, being, respectively, the binary bit for bit position $b_3$ in binary test words $m_{100}$, $m_{101}$, $m_2$, $m_3$, $m_4$ -----$m_{97}$, $m_{98}$ and $m_{99}$ of test data.

Word position No. 3 ($W_{p3}$) of RAM 2 stores test word $m_{102}$ of test data.

Word position No. 4 ($W_{p4}$) of RAM 2 stores n binary bits. Each of said binary bits, reading from bit position $b_1$ through $b_n$ of word position $W_{p4}$, being, respectively the binary bit for bit position $b_3$ in binary test words $m_{201}$, $m_{202}$, $m_{102}$, $m_{103}$, $m_{104}$, $m_{105}$-----$m_{198}$, $m_{199}$ and $m_{200}$ of test data.

Word position No. 5 ($W_{p5}$) of RAM 2 stores test word $m_{203}$ of test data.

Word positions No. 6,7,8----- ($z$–2) ($z$–1) and $z$ of Ram 2 store test words $m_{204}$, $m_{205}$, $m_{206}$ ------$m_{m-2}$, $m_{m-1}$ and $m$. It will be appreciated that test words $m_{204}$ through $m_m$ may include serial and/or parallel test data and that the number of test words, $m$ less 203, may be substantially greater in number than, but in no event less than, the number of word positions, $z$ less 5.

Referring to FIG. 3, assume for convenience of explanation that Pin circuits PE-1 through PE-N have each been set up to perform their respective functions. Then during the next subsequent test step, test word $m_1$, and its associated operational code specifying bits are read from word position No. 1 of RAM 2 under control of the System Controller. The operational code specifying bits associated with test word $m_1$ call for "Test Parallel." In response to this operational code designating "Test Parallel," the Decode Circuitry 4 issues a "Pass Through" Command via leads 3 to Register 100. This command conditions the Register to act as a large gate permitting test word $m_1$ to pass in parallel through Shift Register 100 and be applied to pin circuits PE-1 through PE-N. The remaining portion of this test step has been discussed earlier herein.

It is however to be appreciated that each pin circuit functioning as other than an output, will maintain the condition arrived as a result of an input from a preceding test word, until it is conditioned to receive a subsequent input. Thus the Pin circuits conditioned to function as inputs, energy sources, opens, or grounds will maintain the electrical state arrived at as a result of the input from test word $m_1$.

The next test step will be initiated by the System Controller 1 calling for the next word and operational code from RAM 2. This word from word position No. 2 ($W_{p2}$) of the RAM is a composite word containing one hundred bits in prescribed order. Each bit being the binary bit value from bit position 3 of a predetermined one of said test words $m_2$ through $m_{101}$. Namely, bit positions $b_1$ through $b_{100}$ of the word from word position two of the RAM, respectively contain the binary bit value (logical one or logical zero) for bit positions $b_3$ of each of the test words $m_{100}$, $m_{101}$, $m_2$, $m_3$, $m_4$, $m_5$....$m_{97}$, $m_{98}$ and $m_{99}$. It will be noted that the binary bit contained in bit position $b_3$ of the word from word position 2 of the RAM is the binary bit for bit position $b_3$ of test word $m_2$.

The operational code associated with the word from word position two of the RAM specified Test Serial. The operational code Test Serial is supplied to the Decode Circuitry. The Decode Circuitry in response to the operational code Test Serial and under control of control signals from the System Controller causes a signal on leads 3 to direct shift register 100 to accept the word from word position No. 2 of the RAM. The signal on leads 3 further direct the shift register to store in shift register stages $s_1$, $s_2$, $s_4$, $s_5$------$s_{98}$, $s_{99}$, $s_{100}$, respectively, the binary bits contained within bit positions $b_1$,$b_2$,$b_4$$b_5$-- $b_{98}$, $b_{99}$, $b_{100}$ of the word from word position No. 2 of the RAM, and for stage $s_3$ of the shift register to act as a gate and impress the binary bit value from bit position $b_3$ of said word on the input of pin circuit PE-3.

The operational code Test Serial in cooperation with the Decode Circuitry and under control of the System Controller has also stopped the RAM from delivering further words until a number of test steps functionally related to the content of the word from word position No. 2 of the RAM has elapsed. Namely until a subsequent command from the System Controller is received by the RAM. It will be appreciated that it is a matter of design choice as to how this is accomplished. It will also be appreciated that when only pin circuit PE-3 is to receive an input, it is matter of design choice whether only stage $s_3$ of register 100 is conditioned to provide an output, or whether only pin circuit PE-3 is conditioned to receive an input.

In the above discussed test step only pin circuit PE-3 received an input. Except for pin circuits functioning as an output from the device under test, all pin circuits maintained their status which was arrived at in response to test word $m_1$. Since test word $m_1$ and $m_2$ differ only, if at all, in bit position $b_3$ the impressing of a single input on pin circuit PE-3 has effectively executed the test step called for by test word $m_2$.

For convenience of explanation the preceding two test steps will be referred to as test steps one and two, respectively.

After test step two, the Decode circuitry in response to the operational code Test Serial and under control of the system controller will cause the shift register to shift one position per test step time period and will cause shift register stage $s_3$ to function as a gate during each of these test steps. Whereby during each of these test steps pin circuit PE-3 is the only one of said n pin circuits which will receive an input.

The operation of the tester of FIG. 3 for test steps two through one hundred and one will be illustrated and described with aid of Chart No. 1.

Chart No. 1

Test Data Flow in Register 100 for Test Steps 2 Through 101

| Test Step No. | Shift Register Stage $S_5$ | Shift Register Stage $S_4$ | Shift Register Stage $S_3$ | Test Data (Binary Bit Value) Impressed on Pin Circuit PE 3 |
|---|---|---|---|---|
| 2 | *3-4 | *3-3 | *3-2 | *3-2 |
| 3 | *3-5 | *3-4 | *3-3 | *3-3 |
| 4 | *3-6 | *3-5 | *3-4 | *3-4 |
| 5 | *3-7 | *3-6 | *3-5 | *3-5 |
| 6 | *3-8 | *3-7 | *3-6 | *3-6 |
| 7 | *3-9 | *3-8 | *3-7 | *3-7 |
| 8 | *3-10 | *3-9 | *3-8 | *3-8 |
| 9 | *3-11 | *3-10 | *3-9 | *3-9 |
| 10 | *3-12 | *3-11 | *3-10 | *3-10 |
| . | . | . | . | . |
| | | (Test Steps 11 through 92) | | |
| . | . | . | . | . |
| 93 | *3-95 | *3-94 | *3-93 | *3-93 |
| 94 | *3-96 | *3-95 | *3-94 | *3-94 |
| 95 | *3-97 | *3-96 | *3-95 | *3-95 |
| 96 | *3-98 | *3-97 | *3-96 | *3-96 |
| 97 | *3-99 | *3-98 | *3-97 | *3-97 |
| 98 | *3-100 | *3-99 | *3-98 | *3-98 |
| 99 | *3-101 | *3-100 | *3-99 | *3-99 |
| 100 | *3-2 | *3-101 | *3-100 | *3-100 |
| 101 | *3-3 | *3-2 | *3-101 | *3-101 |

Reference is made to Chart No. 1. Noting that the data in shift register 100 is shifted one stage per test step for test steps 2 through 100 in a counter-clockwise direction, as viewed in FIG. 3, it will be seen that pin circuit PE-3 receives a binary bit input during each of the test steps 2 through 101. It will also be recognized from Chart No. 1 that the binary bit input to pin circuit PE-3 during test steps 2 through 101, respectively, is the binary bit value of bit position $b_3$ of test words $m_2$ through $m_{101}$. Since test words $m_2$ through $m_{101}$, respectively, differ from test word $m_1$, if at all, in only bit position $b_3$, it is seen that during test steps 1 through 101, the device under test has been effectively subjected to mixed serial/parallel test data consisting of 101 test data words. It is to be recognized as a significant feature of applicant's invention that the aforereferenced 101 test words of 100 binary bit values per word were essentially constructed from two binary bit words of 100 binary bits each stored in the word oriented Random Access Memory.

During test step 102, test word $m_{102}$ and its associated operational code specifying bits are read from word position No. 3 of RAM 2 under control of the System Controller. The operational code specifying bits carried by test word 102 call for Test Parallel (TP). Test Parallel results in Decode circuitry 4 rendering a Pass Through command to Shift Register 100. Shift Register 100 in response to this command in the form of an electrical control signal, assumes the condition of a one hundred position activated gate and permits test word $m_{102}$ to pass in parallel there through and be applied to the inputs of pin circuits PE-1 through PE-N. The completion of this test step, as is conventional for each test step, will include the comparison of the electrical manifestation of each output terminal or output pin of the device under test with a known standard. An electrical manifestation indicative of the merit or lack of merit of the output from each output terminal of the device under test will be available for processing or analysis by the System Controller. the System Controller, as is conventional, may provide a hard copy of test results.

The next test step, 103, will be initiated by the System Controller 1 calling for the next word and its operational code from RAM 2. This test word from word position or address No. 4 of the RAM is a composite word containing one hundred binary bits of serial test data. The serial test data may be required to test the device under test, namely to appropriately exercise a circuit structure contained therein that is responsive to a serial train of periodic pulses, or non-periodic pulses. Numerous such structures are known to the art, and when incorporated in high density circuit structures their needs must be met to effectively and efficiently subject them to test conditions. The serial test data of word position No. 4 of the RAM is the test data of any predetermined bit position of each of the test words $m_{103}$ through $m_{202}$. In this illustrative example bit position $b_3$ of the test word corresponding to shift register stage $s_3$ and pin electronic circuit PE-3 has been again selected for convenience of illustration. It will be appreciated that the bit location in the RAM of the bits in a composite test word of serial bit data will be arrived at, or chosen, to facilitate their use in constructing subsequent test words. Hence in this illustrative example the binary value for bit position $b_3$ of test word $m_{103}$ has been stored in bit position $b_3$ of word position NO. 4 of the RAM.

As is well known in the art, device under test (DUT) logic structures that are operated by a serial data stream usually require one or more clocking pulses for each test data step. In the embodiment of FIG. 3, and in the preferred embodiment set forth hereinafter, a suitable clock source or sources must be provided. In the embodiment of FIG. 3 and in the preferred embodiment a clock pulse source provides at least one clock pulse to any DUT pin or pins (except the test serial data pin) during Test Serial operation. It is within the skilled of the art to provide an additional clock source, or sources, as required by the device under test. For example, a clock source may be required, and provided for the Test Parallel operation.

The clock sources expressly shown in applicant's hereinafter disclosed preferred embodiment will be referred to as CLOCK 1 (CL1) hereinafter.

Thus to facilitate testing the serial binary bits have been placed in storage in the RAM in bit position locations that facilitate their use in testing. Binary bit values of bit position 3 of each of the test words $m_{103}$ through $m_{202}$ are respectively stored, in the order recited, in bit positions $b_3$, $b_4$, $b_5$, $b_6$, $b_7$, $b_8$, ----------- $b_{96}$, $b_{97}$, $b_{98}$, $b_{99}$, $b_{100}$, $b_1$ and $b_2$ of word position 4, or address 4, of RAM 2.

Still referring to test step 103 the composite word from word position four of the RAM specifies as an operational code Test Serial. The Decode Circuitry in response to the operational code Test Serial and under control of control signals from the System controller causes a signal on lead 3 to direct shift register 100 to accept the word in parallel from address 4 of the RAM.

The signal on leads 3 further direct the shift register to store in shift register stages $s_1$, $s_2$, $s_4$, $s_5$, $s_6$------$s_{97}$, $s_{98}$, $s_{99}$ and $s_{100}$, respectively, the binary bit values contained within bit positions $b_1$, $b_2$, $b_4$, $b_5$, $b_6$------$b_{97}$, $b_{98}$, $b_{99}$ and $b_{100}$ of the word at address 4 in the RAM. Also during test step 103, stage $s_3$ of the shift register is conditioned to impress the binary bit value contained within bit position $b_3$ of the afore-identified word on the input of pin circuit PE-3.

The operational code Test Serial (TS) in cooperation with the decode circuitry and under control of the System controller inhibits the RAM from delivering further test data words until a number of test steps have been completed. In the instant example this in one hundred, namely test steps 103 through 202. As is apparent these one hundred test steps each utilize test data from the composite test word obtained from address 4 of the RAM.

In test steps 103 through 202 only pin circuit PE-3 and the Clock 1 pin, or pins, receive inputs during each of said steps. All other pin circuits, with the exception of pin circuits functioning as outputs, maintain through latch or storage structure contained therein, their respective electrical state or condition arrived at in response to an input from test word $m_{102}$ during test step 102. The pin circuits performing an output function are respectively conditioned to accept an output from the device under test during each test step.

It is to be appreciated that if the Test Serial pin (in the example pin P-3 and pin circuit PE-3) had been set-up as an output, then the serial test data would be used as the expected DUT output and compared test step by test step with logical one, or logical zero output from the DUT and a Go/No Go signal developed for each test step. As with inputs, Clock 1 (CL1) would be activated and all other pin circuits would remain constant.

The operation of the tester of FIG. 3 for test steps 103 through 202 will now be illustrated and described with reference to Chart No. 2.

Chart No. 2

Test Data Flow in Register 100
For Test Steps 103 through 202

| Test Step No. | Shift Register Stage $S_5$ | Shift Register Stage $S_4$ | Shift Register Stage $S_3$ | Test Data (Binary Bit Value) Impressed on Pin Circuit PE-3 |
|---|---|---|---|---|
| 103 | *3-105 | *3-104 | *3-103 | *3-103 |
| 104 | *3-106 | *3-105 | *3-104 | *3-104 |
| 105 | *3-107 | *3-106 | *3-105 | *3-105 |
| 106 | *3-108 | *3-107 | *3-106 | *3-106 |
| 107 | *3-109 | *3-108 | *3-107 | *3-107 |
| 108 | *3-110 | *3-109 | *3-108 | *3-108 |
| 109 | *3-111 | *3-110 | *3-109 | *3-109 |
| 110 | *3-112 | *3-111 | *3-110 | *3-110 |
| . | . | . | . | . |
| | | (Test Steps 111 through 191) | | |
| . | . | . | . | . |
| 192 | *3-194 | *3-193 | *3-192 | *3-192 |
| 193 | *3-195 | *3-194 | *3-193 | *3-193 |
| 194 | *3-196 | *3-195 | *3-194 | *3-194 |
| 195 | *3-197 | *3-196 | *3-195 | *3-195 |
| 196 | *3-198 | *3-197 | *3-196 | *3-196 |
| 197 | *3-199 | *3-198 | *3-197 | *3-197 |
| 198 | *3-200 | *3-199 | *3-198 | *3-198 |
| 199 | *3-201 | *3-200 | *3-199 | *3-199 |
| 200 | *3-202 | *3-201 | *3-200 | *3-200 |
| 201 | *3-103 | *3-202 | *3-201 | *3-201 |
| 202 | *3-104 | *3-103 | *3-202 | *3-202 |

Reference is made to Chart No. 2. Shift register 100 is shifted one stage per test step in a counter clockwise direction as viewed in FIG. 3 during test steps 102 through 201. Only pin circuit PE-3 receives an input, namely a binary bit value of logical one or logical zero during each of the test steps 103 through 202. The binary bit value of test data that pin circuit PE-3 receives during each of the test steps 103 through 202 is respectively the binary bit value of bit position 3 of test words $m_{103}$ through $m_{202}$. Since test words $m_{103}$ through $m_{202}$ respectively differ from test word $m_{102}$, if at all, in only bit position $b_3$, it is seen that during test steps 102 through 202 the device under test has been effectively subjected to mixed serial/parallel test data consisting of 101 test words of 100 binary bits per word, or 10,100 bits of test data plus one hundred Clock 1 pulses. These 10,100 bits of test data may be said to have utilized only two hundred bit positions of RAM storage, when the storage requirements of the operational code bits are not taken into account.

It will now be readily apparent that if the RAM of FIG. 3 has a storage capacity of four hundred words (where $Z$=400) a very sizeable number of test data words of serial/parallel test data may be efficiently stored therein by the practice of applicant's invention. Assume as a conservative average, that for every ten word positions of storage in the RAM, test data for one hundred test words of mixed serial/parallel data are stored therein. Then the RAM will contain data for the construction of four thousand test words. Namely:

$$(400 \div 10) \times 100 = 4000$$

4000 — Test words constructed from 400 words stores in RAM.
100 — Average number of test words for each 10 word positions of RAM storage capacity.
10 — Average number of RAM word storage positions required per 100 mixed serial/parallel test data words.
400 — RAM capacity in number of full words of test data storage capacity.

It will be appreciated by those skilled in the art that the foregoing example of increased RAM storage capacity for storing mixed serial/parallel test data is most conservative. Many present day high circuit density structures require a very large amount of mixed serial/parallel test data.

Reference is made to the published article entitled "Metal-Oxide-Semi-Conductor Technology" by William C. Hittinger appearing on pages 48 through 57 of the August 1973 issue of "Scientific American" and in particular to the following excerpt therefrom. "The first integrated circuits consisted of about a dozen components on a "chip" measuring a few millimeters on a side. Today many mass-produced integrated circuits consist of more than 3,000 components, chiefly transistors, on chips only slightly larger, and the most advanced circuits contain upward of 10,000 components. It is not unreasonable to expect that by 1980 it will be feasible to build integrated circuits made up of a million transistors and associated components." It is sibmitted that the test apparatus for effectively and efficiently testing these devices will require the storage of a vast amount of mixed serial/parallel test data.

In the prior example of the operation of the tester of FIG. 3 only a single pin circuit (PE-3) received a serial input of binary test data. It will be apparent that the structure of FIG. 3 is capable of supplying a serial input of binary test data to more than one of said $n$ pin circuits during a test step. For example, assume two pin circuits respectively coupled to two adjacent stages of the shift register require a serial input of test data. By causing the shift register to shift two stages per test step and appropriately gating the content of the two adjacent shift register stages to the two pin circuits this can be accomplished. The same approach can be taken to provide serial binary test data to three or more pin circuits respectively connected to three or more adjacent stages of the shift register. In this situation the shift register would be shifted three or more stages per test step.

It will also be apparent that two or more pin circuits respectively connected to non-adjacent stages of the shift register may each be provided with a serial of input of test data by pre-arrangement of the test data bits in the shift register.

It will also be apparent that two or more shift registers may be employed to practice applicant's invention. For example a first register and a second shift register structure and appropriate controls may be appropriately coupled in more or less parallel fashion between the RAM and the pin circuits. Each of these two registers will be independently controlled and respectively provide serial/parallel test data to a pin circuit, or pin circuits.

The prior art has available numerous high speed shift register structures capable of shifting data therin in either a first or a second direction and one or more stages per shift. Any suitable one or more of these shifts registers known to the prior art may be employed to practice applicant's invention.

Numerous advantages result from the practice of applicant's invention. These include the following advantages which will be briefly enumerated and described.

Highly more efficient in utilization of tester local RAM storage capacity. By the practice of applicant's invention 100% utilization of RAM storage capacity is approached versus as low as 2 percent utilization by conventional testers employed with serial/parallel data.

Faster test speed due to reduced RAM loads. In many instances only a single RAM load per device under test of a given part number is required. Due to the very sizeable improvement in utilization of RAM storage capability the RAM may contain an entire test pattern for a given part number. Conventional RAM's have a capacity of 1,000 to 4,000 bits per pin and may by the practice of applicant's invention contain the entire test pattern for a given part number.

When many DUT's in sequence have the same part number (e.g. wafer testing) the average RAM load time will be very small compared to test time. Over 100 times test speed improvement may be accomplished. (The loading of the RAM from the Bulk store is relatively slow and time consuming.)

Faster test speed due to using high speed shift register and pin circuits. Normally the RAM's are practically limited to 50 to 200 *nsec* cycle time making test rates equal to or greater than 5 to 20 MHZ. The pin circuits and shift register circuits total only a few circuits and are much faster. When 20 *nsec* circuits are employed in the pin circuits and shift register there is an additional multiple of up to ten improvement in the testing speed.

Only a limited amount of additioanl hardware is required. Namely one shift register stage per pin circuit and limited additional control and decode logic structure.

PREFERRED EMBODIMENT

The preferred embodiment for practicing applicant's invention will now be described in detail, making reference to FIGS. 3 through 10. FIG. 3 shows applicant's high speed logical tester for testing LSI devices. In the testing of LSI devices in accordance with applicant's teaching the total test partitions are stored in and executed from a solid state RAM with as many parallel outputs as there are devices under test pins. Furthermore, complex LSI logic requires many changes of pins from Input to Output, Masked to Not-Masked (i.e., of No-Go information), and Load to No-Load on any pin or pins mixed in with the I/O test sequences. The preferred embodiment in addition to the earlier enumerated advantages obtained by practicing applicant's invention accomplishes the above in an efficient manner.

The tester has two basic operating modes, namely Set-Up (SU) and Test (T). These are intermixed in the RAM as dictated by the controlling test program. Namely each word in the RAM has associated with it, operational code specifying bits falling within a number of codes calling for the test (T) mode or a number of codes calling for the Set-Up (SU) mode. As explained earlier herein, and as will be fruther explained herein, the operational code specifying bits (*a*, *b*, *c* and *d*) associated with each test word designate the mode (Test or Set-Up) and further specify the specific operation within each of said modes.

The System Controller and Bulk Store, which is preferably a commercially available computer system such as the IBM System/7 loads the RAM with test data and provides appropriately timed timing signals hereinafter referred to as, "Drive Time," "Strobe Time," "X-Time," "Y-Time," and "Clock 1" time. The System Controller also provides Analog levels to the pin circuits coupled to the output pins of the device under test. The results from the comparison of the output from the device under test and the Analog limits supplied by the System Controller are conveyed to the System Controller. As explained earlier these results may be processed, analyzed, printed out or visually displayed.

Stated differently the System Controller generates and provides appropriate analog levels and limits used in the Pin Electronic circuits and receives Go/No Go data from the Pin Electronic circuits.

Figure 8:
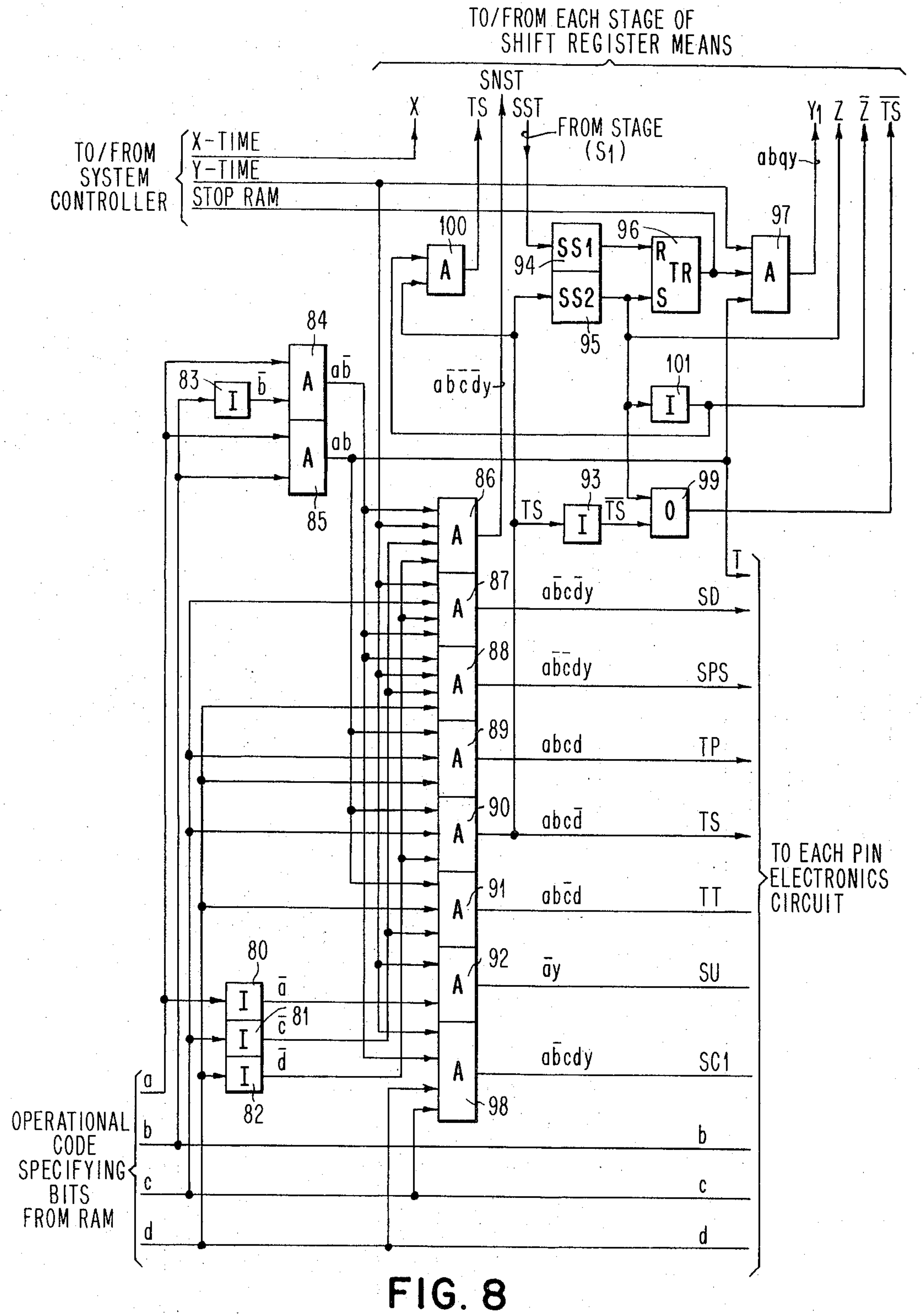

The Decode Circuitry (FIG. 8)

Figure 6:
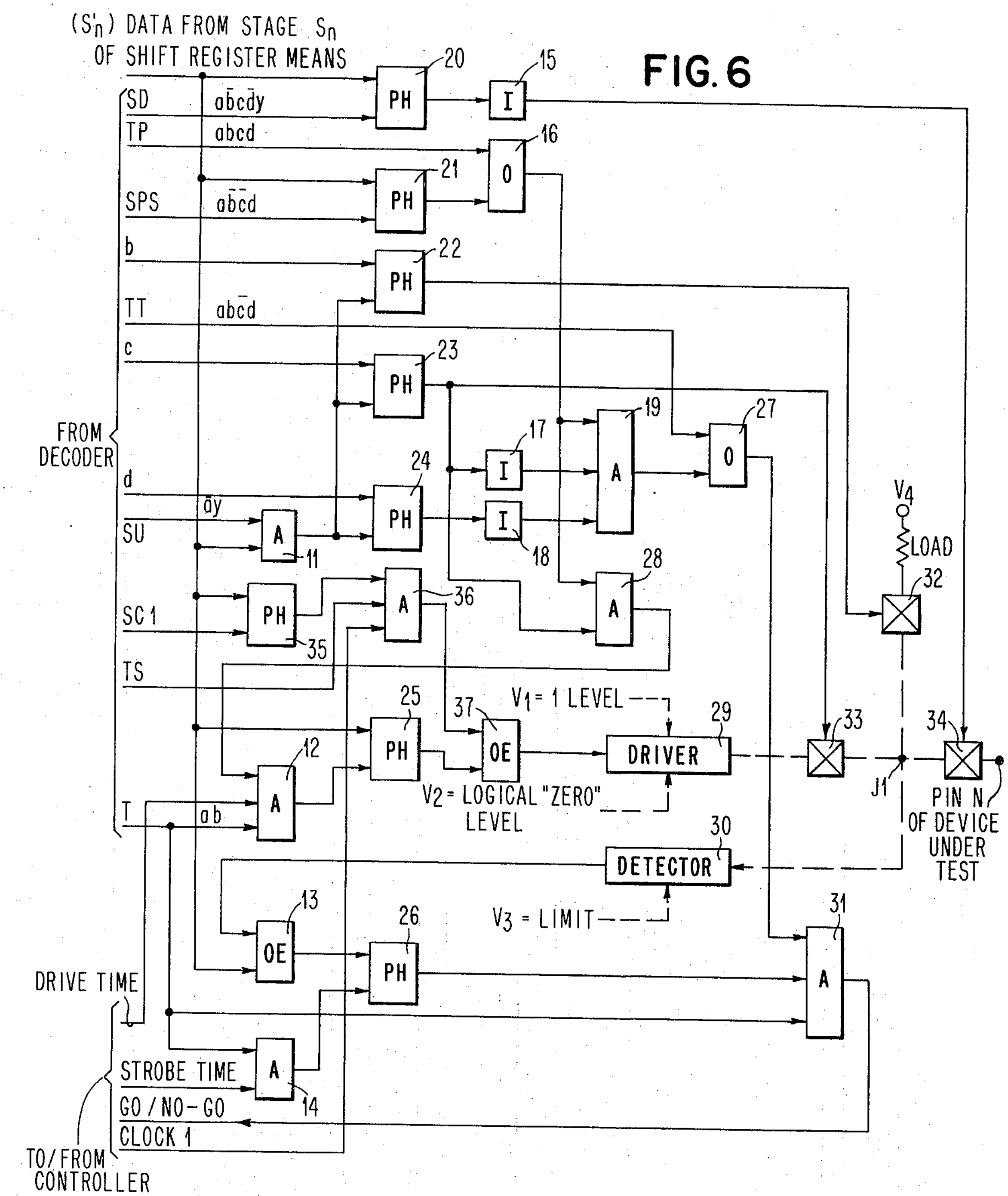

The Decode circuitry receives the operational Code specifying bits from the RAM and provides electrical manifestations, calling for the specified operation, to the Shift Register Means (FIG. 4) and the Pin Electronic Circuits (FIG. 6). The information conveyed from the Decode circuitry to the Pin Electronic circuits and the Shift Register Means is bussed in parallel. The Pin electronic circuits receive per-pin or per-pins information fromthe Shift Register and the RAM via leads $S'_1$ through $S'_n$, respectively.

Referring to FIG. 8 it will be seen that the Decode Circuitry receives as inputs from the System Controller periodic pulses respectively designated as X-Time and Y-Time. The Decode Circuitry sends to the Controller a "STOP-RAM" signal during a Test Serial Operation. The STOP-RAM signal informs the Controller that a Test Serial operation is being executed. The Decode Circuitry also receives from the RAM operational code specifying bits designated as *a*, *b*, *c* and *d* in FIG. 8.

Figure 4:
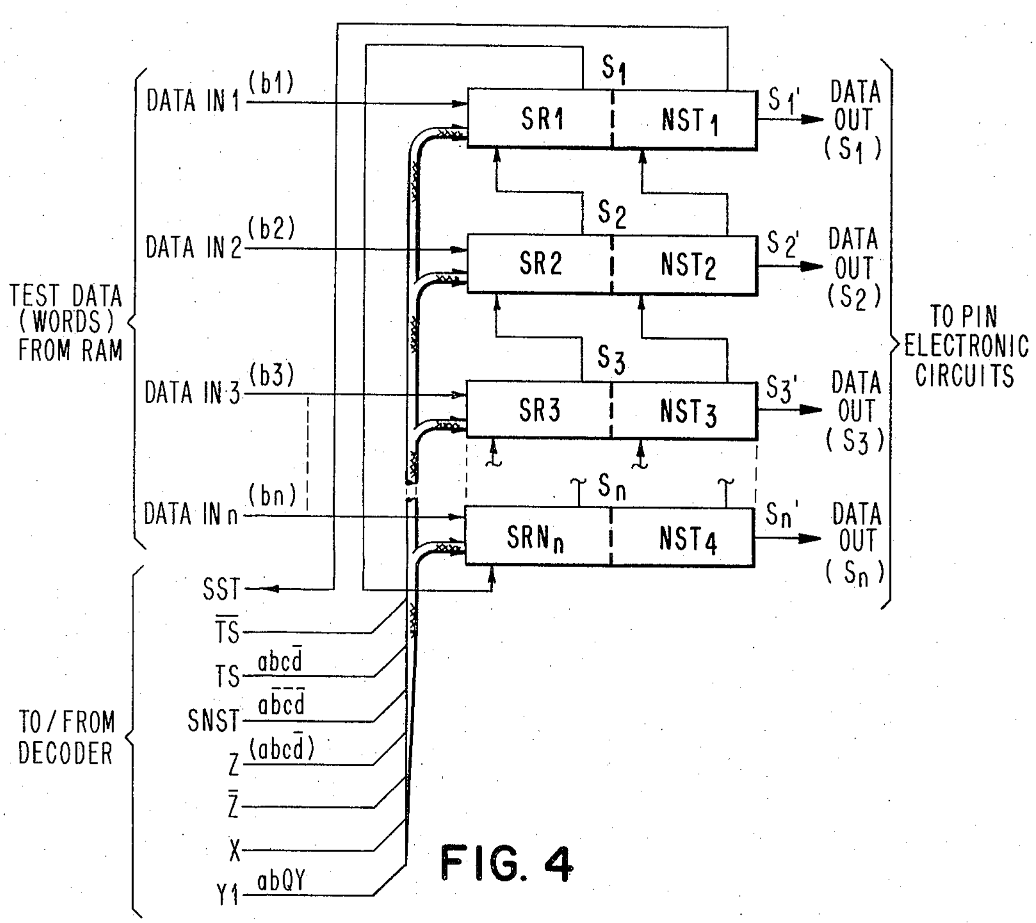
FIGS. 4 through 8 viewed in conjunction with FIG. 3 disclose the preferred embodiment of applicant's high speed tester for testing high circuit density devices.

The X-Time pulses are directly transmitted to each stage of the Shift Register Means of FIG. 4. The Y-

Time pulses are impressed on an input of each of the AND Circuits 86, 87, 88, 92, 97 and 98. Operational code specifying bit *a* is impressed on the input of Inverter 80, an input of AND circuit 84, and an input of AND circuit 85. Operational code specifying bit *b* is impressed on the input of Inverter 83 and an input of AND circuit 85. Operational code specifying *c* is impressed on the input of Inverter 81, an input of AND circuit 87, an input of AND circuit 89, an input of AND circuit 90, and an input of AND circuit 98. Operational code specifying bit *d* is impressed on the input of Inverter 82, an input of AND circuit 88, an input of AND circuit 89, an input of AND circuit 91, and an input of AND circuit 98. The output of Inverter 80 is connected to an input of AND circuit 92. The output of Inverter 81 is connected to an input of each of the AND circuits 86, 88 and 91. The output of Inverter 82 is connected to an input of each of the AND circuits 86, 87 and 90. The output of Inverter 83 is connected to an input of AND circuit 84.

The output of AND circuit 84 is UP, for the logical condition $a\bar{b}$. The output of AND circuit 84 is impressed on an input of each of the AND circuits 86, 87, 88 and 98. The output of AND circuit 85 is UP for the logical condition *ab*. The output of AND circuit 85 is impressed on an input of each of the AND circuits 89, 90, 91 and 97, and via the lead designated T, for Test Mode, is conveyed to each of the PIN Electronic Circuits. The output of AND circuit 86 is UP for the logical condition $a\bar{b}c\bar{d}y$ and conveys to each stage of the Shift Register means the instruction, or operational code, SNST (Set Number of Serial Tests) at Y-Time. The output of AND circuit 87 is UP for the logical condition $a\bar{b}c\bar{d}y$ and conveys to each of the PIN Electronic Circuits the instruction, or operational code, SD (Set Disconnect) at Y-Time. The output of AND circuit 88 is UP for the logical condition $a\overline{bc}dy$ and conveys to each of the PIN Electronic Circuits the instruction SPS (Set PIN Serial) at Y-Time. The output of AND circuit 89 is UP for the logical condition abcd and conveys to each of the PIN Electronic Circuits the instruction TP (Test Parallel. The output of AND circuit 91 is UP for the logical condition $ab\bar{c}d$ and conveys to each of the PIN Electronic Circuits the instruction TT (Test Tester). The output of AND circuit 92 is UP for the logical condition $\bar{a}y$ and via the lead designated SU, the PIN circuits are informed at Y-Time that the tester is in the SET-UP Mode of operation.

The output of AND circuit 90 is UP for the logical condition $abc\bar{d}$ and conveys to each of the PIN Electronic Circuits the instruction TS (Test Serial). The output of AND circuit 90 is also connected to the input of Single-Shot 95, and via Inverter 93 and OR circuit 99 to each stage of the Shift Register means. The output of AND circuit 90 is also connected to an input of AND circuit 100. The other input of AND circuit 100 is coupled via Inverter 101 to the output of Single Shot 95. The output of AND circuit 100 designated as TS is conveyed to each stage of the Shift Register Means. The output of Inverter 101 is also conveyed to each stage of the Shift Register means as a z pulse (not *z* pulse). When AND circuit 90 is not activated, namely the logical requirements therof are not fulfilled, each stage of the Shift Register Means also receives via inverter 93 and OR circuit 99 an electrical manifestation designated as $\overline{TS}$ (NOT TEST SERIAL).

Single Shots, or monstable devices, 94 and 95 are each preferably rising edge sensitive and generate the same pulse width. Trigger, or bistable device, 96 is set to a first, or on, state in response to a pulse from Single Shot 95 and reset by a pulse from Single-Shot 94. When the output of AND circuit 90 is UP (logical condition $abc\bar{d}$) Single Shot 95 will generate an output pulse which will cause trigger 96 to assume its first state and provide an UP output. The output pulse of the Single Shot 95 is for convenience designated as a Z pulse and conveyed to each stage of the Shift Register Means. The inverted output of Single Shot 95 is also conveyed to each stage of the Shift Register means as a $\bar{z}$ pulse. When AND circuit 90 is conditioned (abcd), AND circuit 85 is also conditioned since its logical requirement is ab. Thus with Trigger 96 in its on state, AND circuit 97 will be conditioned by a Y-Time pulse and provide a $Y_1$ pulse on lead $Y_1$ to each stage of the Shift Register Means. With the UP output of Trigger 96 designated as q, the logical condition required for the output of AND circuit 97 being UP is abqv. The UP output of Trigger 96 is also conveyed to the System Controller as a STOP RAM signal.

The input to Single Shot 94 is a pulse SST (STOP Serial Test) from the first Stage, $S_1$, of the Shift Register Means. The SST pulse causes the Single Shot 94 to issue a pulse and reset Trigger 96. The SST pulse's function is to inform the decode circuitry that Test Serial (TS) has been complete. AND circuit 100 and OR circuit 99 delay the change in operational code from $\overline{TS}$ to TS being fed to the Shift Register Means by the time equal to the pulse width of the *z* pulse. This allows the RAM data word for the first test step of a TEST SERIAL operation to be loaded into the Shift Register Means.

AND circuit 98 is conditioned by operational code specifying bits *c* and *d* as well a the output from AND circuit 84 at Y-time The output of AND circuit 98 is designated as SC1 (SET CLOCK 1) and conveyed to each PIN Electronic Circuit.

Figure 7:
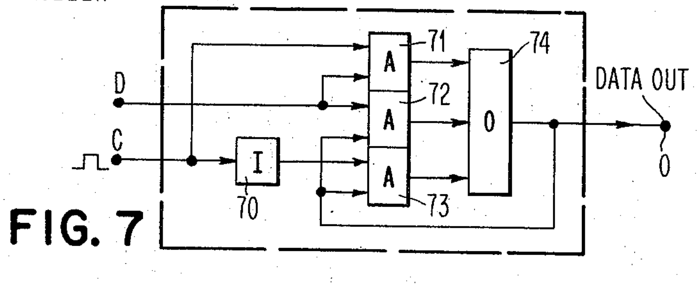

Polarity Hold Latch (PH, FIG. 7)

The Polarity Hold Latch of FIG. 7 is a hazard free latch employed in the Shift Register Means of FIG. 4 and the PIN circuit of FIG. 6.

The Polarity Hold Latch has two inputs which for convenience are referred to as a data input D and clock input C, and an output O.

Figure 7A:
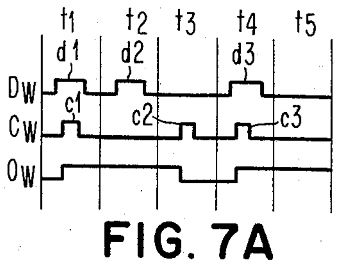
FIG. 7A discloses waveforms to be viewed in conjunction with the explanation of the operation of the hazard free polarity hold latch shown in FIG. 7.

Reference is made to waveforms $D_w$, $C_w$, $O_w$ shown in FIG. 7A. These wave forms are not necessarily representative of waveforms occurring in applicant's tester. They are set forth merely as a convenience in explaining the logical operation of the Polarity Hold Latch. Referring to FIG. 7A, it will be seen that data pulses $d_1$ and $d_3$ of of waveform $D_w$ respectively fall subsequent in time to clock pulses $C_1$ and $C_3$ of waveform $C_w$. Each data pulse may rise prior to, or subsequent to, the rise of its associated clock pulse, providing at least a portion of the data pulse and clock pulse are coincident in time, and the fall of the data pulse (or data level) is slightly subsequent in time to the fall of the associated clock pulse. Still referring to FIG. 7A a number of equal pulse time intervals are represented as $t_1$, $t_2$, $t_3$, $t_4$ and $t_5$. As shown the pulse intervals are periodic and the data pulses and clock pulses are respectively non-periodic.

During time interval $t_1$ the coincident existence of pulses $d_1$ and $c_1$ activates AND circuit 71 and causes the output thereof to be UP. The UP output of AND circuit 71 is conveyed via OR circuit 74 to the lower input of AND circuit 72 and to the lower input of AND circuit 73. When clock pulse $C_1$ falls, AND circuit 71 will be de-activated; however, AND circuit 72 has been activated by the coincident data pulse $d_1$ and the UP condition of the output of OR circuit 74. When the clock pulse $C_1$ falls the output of inverter 70, which is connected to the second input of AND circuit 73, rises. Prior to the fall of the data pulse $d_1$ which is at least shortly subsequent in time to the fall of the clock pulse $C_1$, AND circuit 73 is activated and the Latch is set. When the Latch is set the output O thereof is UP. When the Latch is set the following conditions exist: the output of inverter 70 is UP causing the second input of AND circuit 73 to be UP; the first input of AND circuit 73 is UP via the feedback loop from the output of OR circuit 74. The Latch when set maybe as an energized electrical loop consisting of energized AND crcuit 73, the output of AND circuit 73 connected to the input of OR circuit 74 and the output of OR circuit 73 connected via a feedback loop to the first input of AND circuit 73. It will remain energized in the absence of a clock pulse causing the output of Inverter 70 to fall and thereby removing the UP condition impressed on the first input of AND circuit 73.

Recalling that the latch circuit of FIG. 7 has been set during pulse time interval $t_1$, attention is directed to pulse time interval $t_2$. During this interval a data pulse $d_2$ occurs in the absence of a clock pulse. The data pulse $d_2$ activates AND circuit 72, however the electrical loop remains energized and the Latch remains set since activated AND circuit 73 is not effected thereby.

Now directing attention to pulse time interval $t_3$ it is seen that clock pulse $C_2$ occurs in the absence of a data pulse or 1 level. The rise of the clock pulse causes the output of Inverter 70 to fall and AND circuit 73 is de-activated. The de-activation of AND circuit 73 breaks the afore identified energized loop and the output O of the Latch falls and assumes the Down condition. In other words the Latch has been reset.

From FIG. 7A waveform $O_w$, it will be seen that the Latch was set by the coincidence of pulses $d_1$ and $c_1$ uneffected by data pulse $d_2$ in the absence of a coincident clock pulse, and reset by clock pulse $c_2$ in the absence of a coincident data pulse. Coincident pulses $d_3$ and $c_3$ will set the Latch. The Latch will thereafter be reset only by a subsequent clock pulse impressed on input terminal C in the absence of a concident data pulse.

Again referring to FIG. 7A it will be apparent from waveforms $D_w$, $C_w$ and $O_w$ that under control of the clock pulses the output of the Latch will follow and manifest the polarity of the data input level. Namely the output of the Latch will be UP when the last occurring clock pulse saw an UP level data input, and the output of the Latch will be DOWN when the last occurring clock pulse saw a DOWN level data input.

Figure 5:
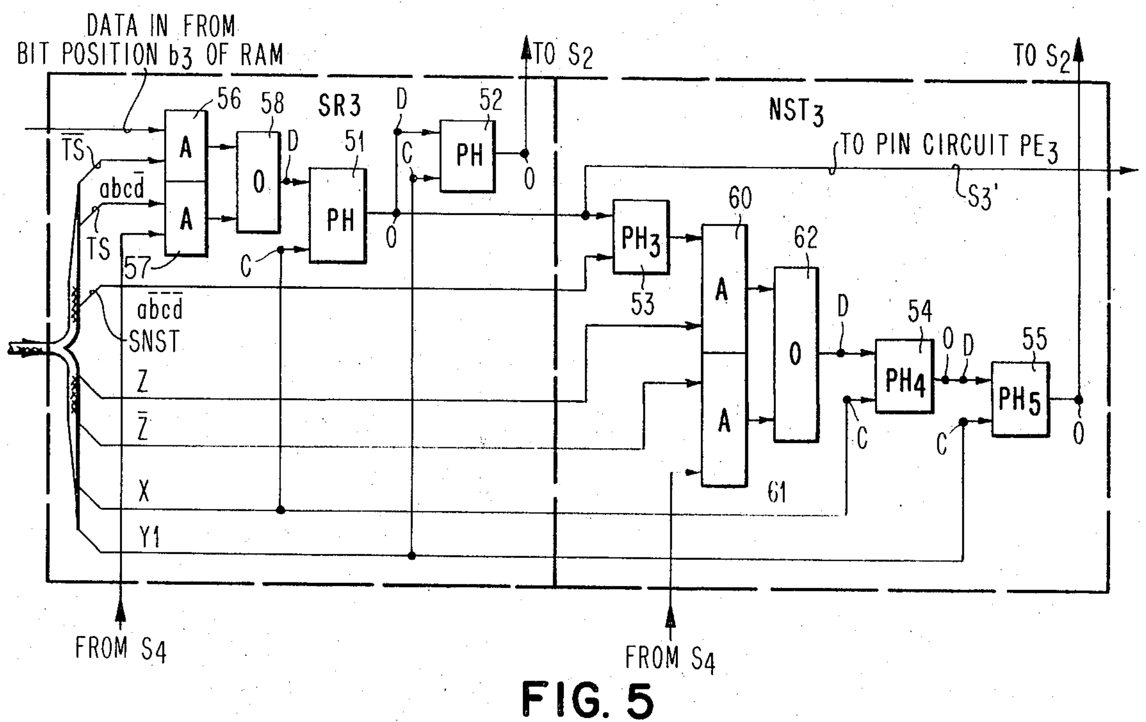

A Single Stage of the Shift Register Means (FIG. 5)

The Shift Register Means has $n$ like stages. For purposes of explanation the logical structure of stage $S_3$ is represented in FIG. 5. Each stage has interconnected first and second circuit portions respectively designated as SR (Shift Register) and NST (Number of Serial Tests). See $SR_3$ and $NST_3$ in FIG. 5. The shift register portions of the Shift Register Means stores the test data obtained from the RAM and impresses the test data on the pin electronic circuits. The NST portions of the Shift Register Means, as explained hereinafter, controls the number of serial tests to be performed.

Now referring to FIG. 5 assume that during test step $m-100$, an operational code other than Test Serial (TS) is called for by operational code specifying bits $a,b,c$ and $d$. Namely, the operational code specifying bits do not specify the logical condition abc$\bar{d}$. Thus the lower input of AND circuit 56 is UP and the test data input from bit position $b_3$ of a word position in the RAM will be impressed on the upper input of AND circuit 56. The test data, namely an electrical manifestation of a alogical one or logical zero, as dictated by the test program, is impressed via AND circuit 56 and OR circuit 58, on the data input D of polarity hold Latch 51. During test step $m-100$, the $x$-time pulse impressed on clock input C of Latch 51 will cause this Latch to store the test data, namely a binary one, or a binary zero. When Latch 51 stores a binary one the output thereof will electrically manifest a binary one condition by an UP level. When Latch 51 stores a binary zero the output thereof will electrically manifest a binary zero condition by a DOWN level. As will be seen from FIG. 5 the output of Latch 51 is also impressed on the data inputs D of Latches 52 and 53 and is conveyed to Pin Circuit PE3. Now further assume that during the test step $m-100$ an operational code other than SNST (Set number of Serial Tests) is called for by the operational code specifying bits. Then the function of the shift register has been completed, namely the storing of test data and the conveying of the test data to the Pin Circuits. The operational codes and the logical requirements calling for a particular operation, as set forth in FIG. 10, will be explained in detail hereinafter It is sufficient to note at this time that where the operation called for is other than Test Serial (TS) or Set Number of Serial Tests (SNST) each stage of the Shift Register Means functions as described above.

The Latch 52 of the shift register portion of stage $S_3$ is utilized, under control of a Test Serial (TS) operation, and in response to a $Y_1$ pulse, to shift test data from Latch 51 of stage $S_3$ to Latch 51 (not shown) of stage $S_2$.

The Set Number of Serial Tests (SNST) operation is used to set a logical one in the NST portion of any predetermined stage of the Shift Register Means and to thereby control the number of Serial Test steps, or cycles, to be performed during a Test Serial operation.

Now assume that during the test step M-124 a word of test data is conveyed from the RAM to the Shift Register Means. The operational code calls for a b c d, namely Set Number of Serial Tests (SNST). Assume further for purposes of explanation that only the nth stage of the Shift Register Means, namely $S_n$, from the RAM an electrical manifestation of a logical one. All remaining stages of the Shift Register Means receive an electrical manifestation of a binary zero.

The operational code specifying bits a $\bar{b}$ $\bar{c}$ $\bar{d}$ calling for SNST are presented to the Decode circuitry (FIG. 8). The ouput of AND circuit 86 of the Decoder is UP at "V time," electrically manifesting the operation SNST. The output of Inverter 93 (FIG. 8) is UP, electrically manifesting that the operation is not Test Serial ($\overline{TS}$). Referring to FIG. 5 it will be apparent from the earlier description that AND circuit 56 will manifest a logical one at its output, and Latch 51 will at x-time store a logical one. With the output of Latch 51 connected to the data input of Latch 53, Latch 53 will also store the logical one. Latch 53 has its clock input C connected to the output of AND circuit 86 of the Decode circuitry of FIG. 8. The logical condition for activating AND circuit 86 is $a\overline{bcd}y$ namely the operational code for SNST at y-time.

Now assume that during test step M-123 the test word presented by the RAM to the Shift Register Means carries with it operational code specifying bits calling for *abc* (1111) namely Test Parallel (TP). AND circuit 89 of the Decoder (FIG. 8) will be energized and appropriately condition the PIN Electronic circuits as explained hereinafter. Also, since AND circuit 90 of the Decoder is not energized the $\overline{TS}$ inputs of each AND circuit 56 of each stage, $S_1$ through $S_n$, of the Shift Register Means will be conditioned. The remaining, or data inputs of each AND circuit 56 of each stage, $S_1$ through $S_n$ of the Shift Register Means, will respectively have impressed thereon test data. Namely, the logical contents of bit positions $b_1$ through $b_n$ of the test word from the Ram will be respectively impressed on the data inputs of stages $S_1$ through $S_n$. At x-time each of the polarity Latches 51 of stages $S_1$ through $S_n$ will store a binary bit (a logical one, or a logical zero) of the test word of test step M-123. The logical content, namely one to zero stored within each Latch 51 will be electrically manifested by the UP or DOWN state of the Latch's output. The UP or DOWN state of each Latch 51 is impressed via leads $S_1$ through $S_n$ respectively on the inputs of PIN Electronic Circuits PE1 through PEN.

Now assume that during the next test-step, namely M-122 the test word obtained by the Shift Register Means also carries with it the operational code Test Parallel (TP). The sequence of operation recited above in explanation of test step M-123 will be repeated.

It is to be noted that the test word of test step M-121 is a composite test word, namely it contains a binary bit (logical one or logical zero) for a single same predetermined bit position of the next to be employed one hundred test words. Namely a binary value (logical one or zero) for a predetermined bit position of the test words for test steps M-121 through M-22 respectively. Assume for ease of discussion that the predetermined bit position is $b_3$ of the test word. Namely the bit to be impressed on PIN Electronic circuit PE-3 during the test steps M-121 through M-22. Also accept at this time, subject to complete detailed explanation hereinafter, that the PIN Electronic circuits have throughout these examples been appropriately set-up.

Thus at the initiation of test step M-121 the following conditions exist: Latches 51 of stages $S_1$ through $S_n$ have stored therein a composite test word, consisting of logical ones and zeros; Latch 53 of stages $S_n$ contains therein a logical "one"; and only PIN Electronic Circuit PE3 is conditioned to receive a test data input. All PIN circuits other than PE-3 are precluded from accepting a test data input. For test-step M-121 the operational code changes to Test Serial (TS). The Decode Circuitry receives code specifying bits $a\ b\ c\ \overline{d}$ (1110) calling for Test Serial. The output of AND circuit 90 of the Decoder of FIG. 8 is UP. The upper input of AND circuit 57 of FIG. 5 remains DOWN for the duration of the Z pulse. The lower input of AND circuit 56 remains UP for the duration of the Z pulse. Thus at X-Time of test step M-121 the composite test word from the RAM is gated via OR circuits 58 into Latches 51 of the Shift Register Means.

The change to an UP condition of the output of AND circuit 90 (FIG. 8) initiates the following: Single-Shot 95 of the Decoder generates an output pulse Z. Trigger 96 is set by the Z pulse; the upper input (TS) of AND circuit 57 of each stage of the Shift Register Means is conditioned at the conclusion of the Z pulse; the lower input $\overline{TS}$ of AND crcuit 56 of each stage of the Shift Register Means is deconditioned at the conclusion of the Z pulse.

AND circuit 97 (FIG. 8) will be conditioned by each *y*-time pulse while Trigger 96 is set. This occurs since the center input of AND circuit 97 is conditioned by the output of AND circuit 97 of Trigger 96, the lower input is conditioned because the tester is in the Test (T) mode, and the third input of AND circuit 97 has impressed thereon *y*-time pulses. The periodic pulses appearing at the output of AND circuit 97, while Trigger 96 is set, will be referred to as $Y_1$ pulses to distinguish them from periodic Y-time pulses provided continuously be the controller. $Y_1$ pulses are actually Y-time pulses occurring only during a Test-Serial operation.

The Z pulse provided by Single Shot 95 is wide pulse fully encompassing in time duration the Y-time pulse ($Y_1$) and the x-time pulse of test step M-121.

The Z pulse is impresssed, during test step M-121, on an input of each AND circuit 60 of each stage of the Shift Register Means (see FIG. 5). The $\overline{Z}$ pulse from Inverter 101 (FIG. 8) is impressed on an input of each AND circuit 61 of each stage the Shift Register Means (FIGS. 4 and 5). A single Z pulse is generated during each Test Serial operation. One Z pulse for a plurality of test steps.

It will be recalled that only Polarity Hold Latch 53 of stage $S_n$ contains a logical one. Latch 53 of the remaining stages respectively contain a logical zero.

Referring to FIG. 5 it will be apparent that the UP condition of the output of Latch 53 of stage $S_n$ for the duration of the Z pulse will be impressed via AND circuit 60 and OR circuit 62 on the Data input of Latch 54. At *x*-time of test step M-121 the clock input of Latch 54 is conditioned and the output of Latch 54 will assume the UP condition manifesting the storage of a binary one.

Also during test step M-121, for each stage, the logical content (binary one of binary zero) of Latch 51 is transferred to Latch 52. Namely, referring to FIG. 5, at *y*-time ($Y_1$) of test step M-121, the logical content oof Latch 51 is transferred to Latch 52 in preparation for a one stage shift in data in the Shift Register Means at x-time of the next test step M-120. At x-time of test step M-120, referring to FIG. 5, and considering for sake of simplicity only stages $S_3$ and $S_4$, the logical content of Latch 52 of stage $S_4$ is transferred to Latch 51 of stage $S_3$ via AND cicuit 57 and OR circuit 58. This is accomplished under control of the x-Time pulse impressed on the clock input of Latch 51 of stage $S_3$. It will now be apparent that during test step M-120 the logical content of Latch 51 of each stage of the Shift Register Means was shifted one stage. Namely $S_1$ to $S_n$, $S_2$ to $S_1$, $S_3$ to $S_2$, $S_4$ to $S_3$, $S_5$ to $S_4$---------$S_{n-5}$ to $S_{n-6}$, -6, $S_{n-4}$ to $S_{n-5}$ , $S_{n-3}$ to $S_{n-4}$, $S_{n-2}$ to $S_{n-3}$, $S_{n-1}$ to $S_{nn-2}$ and $S_n$ to $S_{n-1}$. (In this illustrative example of the operation of the preferred embodiment n equals one hundred. It will be appreciated that n may be any integer).

Since DUT's require clocking while serial test data is being fed in, or read out, express provision is made in the preferred embodiment for applying a clock, (Clock 1) to any DUT pin, or pins, requiring the same. Additional clocks may be provided as needed in a similar manner.

Figure 9:
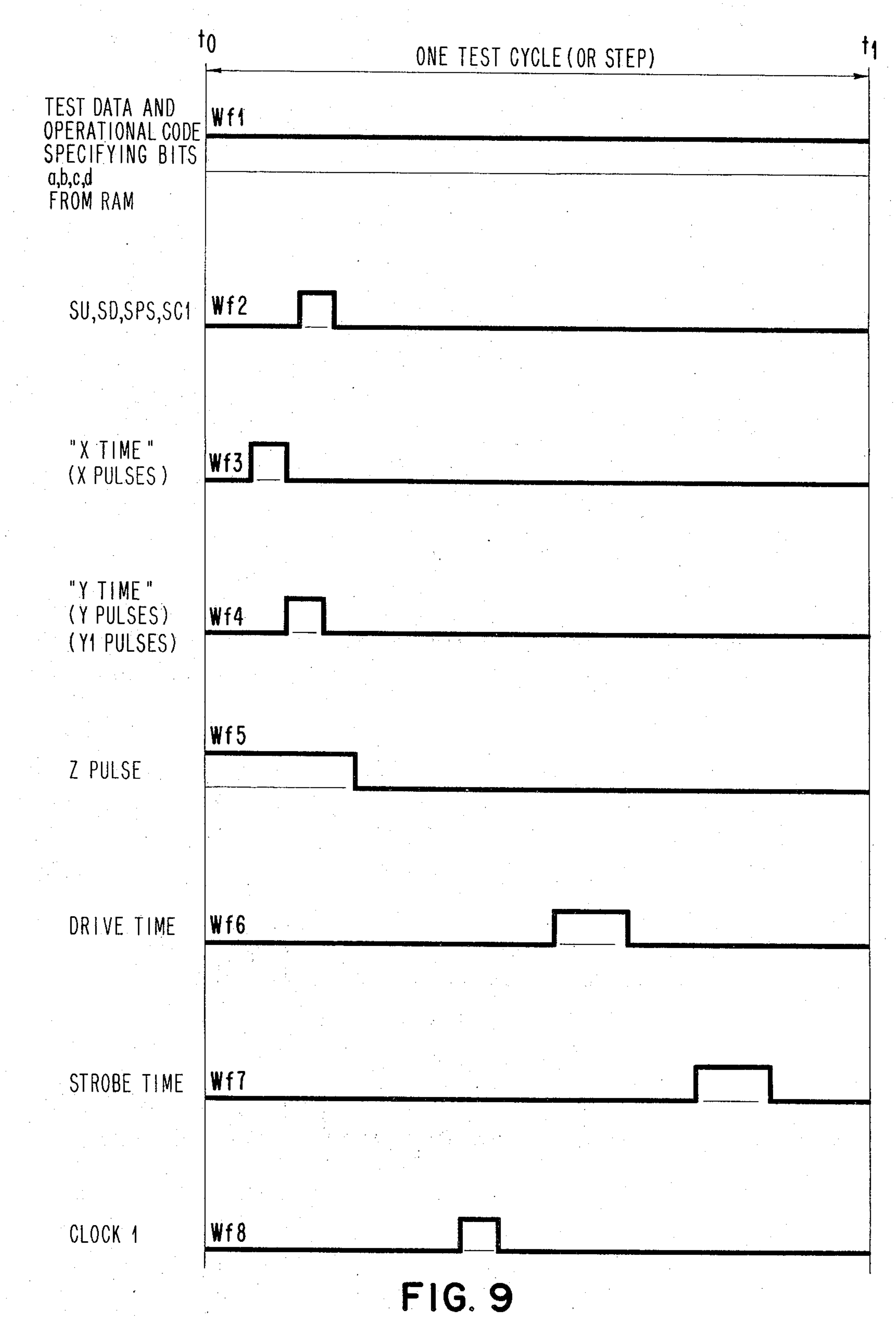
FIG. 9 discloses a timing chart to be viewed in conjunction with the explanation of the operation of the preferred embodiment.

The Operational Code SET CLOCK 1 (SCl) is called for by the Operational Code specifying bits a̅bcd (1011). Any PIN Electronic Circuits receiving a logical one during the execution of a SET CLOCK 1 operation will have its Latch 35 set. [It will be noted that the output of AND circuit 98 (FIG. 8) is UP during the execution of an SCl instruction. The output of AND circuit 98 is impressed on the clock input of Latch 35 (FIG. 6)] Referring to FIG. 6 and specifically Latch 35 and AND circuit 36 it will be seen that Pin circuits having a logical one stored in Latch 35 will accept Clock 1 pulses during a TEST SERIAL Operation. Referring to FIG. 9, waveform $W_{f8}$, a Clock 1 pulse is provided by the controller during each test cycle, or test step.

Thus for each TEST SERIAL test cycle, or test step, (in this example test steps 121 through 22) of the TEST SERIAL Operation the pre-conditioned PIN Electronic Circuit, or Circuits, will receive a Clock 1 (CL1) pulse.

Now that test steps M-121 and M-120 have been completed, as recited above, the following recitation is deemed in order. As seen from the logic of FIG. 8 only a single wide Z pulse is generated during the first test step or cycle of a Serial Test Operation; a Serial Test Operation may span one hundred or more test steps or cycles; only a single composite test word is obtained from the RAM for a Serial Test Operation which may span up to one hundred Test Steps; the controller provides periodic *x*-time, *y*-time and Clock 1 pulses during a test operation; a *x*-time pulse occurs during each test step; a *y*-time pulse occurs during each test step; a Clock 1 pulse occurs during each test step; $Y_1$ pulses are generated only during a Test Serial (TS) operation and are utilized only by the Shift Register Means; and single $Y_1$ pulse is provided during each test step of TEST SERIAL Operation; for each teststep of a Serial Test Operation the test data in the shift register portion is shifted one position or stage; for each test-step, subsequent to the first test step, of a Serial Test Operation the logical one in the NST (Number of Serial Tests) portion of the Shift Register Means is shifted one position; the initial placement (particular stage) of a logical one in the NST portion of the Shift Register Means determines the number of serial test steps to be performed under a TEST SERIAL (TS) Operation; SST (Stop Serial Test) command from the NST portion of stage $S_1$ signals the completion of the Serial Test Operation; during a Serial Test Operation only any one PIN Electronic circuit is conditioned to accept a test data input. (PE 3 in the above example).

Now returning to the example of TEST SERIAL Operation, the operation of the tester for test steps, or cycles, M–119 through M–22 will be explained.

Test Step M-119

During test step M-119, in the same manner, and in the same direction as recited in detail in the explanation of test step M-120, the test data in the Shift Register Means is shifted one stage, or position. It will be recalled, of the n latches designated by the reference character 54 (one in each NST portion of each stage of the Shift Register Means), only Latch 54 of stage $S_n$ contains a logical one. The output of Latch 54 of stage $S_n$ is connected to the data input of Latch 55 of stage $S_n$. Thus at *y*-time ($Y_1$) of test step M-119, the clock input of Latch 55 of Stage $S_n$ is conditioned and a logical one is stored in said Latch. The UP condition of the output of Latch 55 of Stage $S_n$ is impressed on the Data input of Latch 54 of Stage $S_{n-1}$, since AND circuit 61 of stage $S_{n-1}$ is conditioned. AND circuit 61 of Stage $S_{n-1}$ has its upper input conditioned by the output of Inverter 59 in the absence of a Z pulse. (Note, a Z pulse only occurs during the first test step of a TEST SERIAL (TS) Operation). The lower input of AND circuit 61 of Stage $S_{n-1}$ is conditioned by the output of Latch of stage $S_1$ 55 of Stage $S_n$. The UP output AND circuit 61 is impressed via OR circuit 62 on the data input of Latch 54 of stage $S_{n-1}$. At x-time of test step M-119 the clock input of Latch 54 of stage $S_{n-1}$ is conditioned. Thus during test step M-119 the logical one contained in Latch 54 of stage $S_n$ is transferred, or shifted, to Latch 54 of stage $S_{n-1}$.

Test Step M-118

In the same manner and direction, as recited in detail earlier herein, the test data in the Shift Register Means is shifted one stage during test step M-118. The y-time ($Y_1$) pulse occurring test step M-118 will transfer the logical one from Latch 54 of stage $S_{n-1}$ to Latch 55 of stage $S_{n-1}$. The *x*-time pulse of test step M-118 will transfer the logical one from Latch 55 of stage $S_{n-1}$ to Latch 54 of stage $S_{n-2}$.

Test Step M-117

During test step M-117 the test data stored in the Shift Register Means is shifted one stage and the logical one from Latch 54 of the NST portion of stage $S_{n-2}$ is transferred to latch 54 of the NST portion of stage $S_{n-3}$.

Test Step M-116

The test data in the Shift Register Means is shifted one position. The logical one in the NST position of the Shift Register Means is shifted one position.

Test Steps M-115 through M-23

For each of the Test Steps M-115 through M-23 the test data in the Shift Register Means is shifted one position, and the logical one in the NST portion of the Shift Register Means is shifted one position.

Test Step M-22

The test data in the Shift Register is shifted one position. Latch 54 of the NST portion of Stage $S_1$ has a logical one stored therein. During *y*-time ($Y_1$) of testp step M-22, the logical one is transferred from Latch 54 of Stage $S_1$ to Latch 55 of Stage $S_1$. The UP output of Latch 55 electrically manifests the command STOP SERIAL TEST (SST) and is impressed on the input of Single Shot 94 of the Decoder of FIG. 8. In response to the command STOP SERIAL TEST, Single Shot 94 generates an output pulse with resets Trigger 96. The resetting of Trigger 96 deconditions the center input of AND circuit 97. The deconditioning of ANd circuit 97 terminates the generation of $Y_1$ pulses in response to *y*-time pulses. Thus the Serial Test (TS) operation is terminated after a sizeable number, one hundred in the instant example, of test steps or cycles.

The Shift Register Means (FIG. 4)

The Shift Register Means of FIG. 4 has *n* like stages (FIG. 5). The Shift Register portion of each stage is coupled to the Shift Register portion of adjacent stages. For example, the Shift Register portion of stage $S_1$ is coupled to the Shift Register portions of Stages $S_2$ and $S_n$. With the exception of Stage $S_n$, the Number of Serial Test's portion of each stage of the Shift Register Means is coupled to the NST portions of adjacent stages. As seen from FIG. 4 the output of the NST portion of Stage $S_1$ provides the STOP SERIAL TEST (SST) command, and the input of the NST portion of Stage $S_n$ is not coupled to the output of the NST portion of Stage $S_1$. From the earlier description of FIG. 5 it will be apparent that the NST portion of Stage $S_n$ does not require AND circuit 61 and OR circuit 62.

The Shift Register Means of FIG. 4 receives test data from the RAM on inputs Data In ($b_1$), Data In ($b_2$), Data In($b_3$)--- --- Data In ($b_{n-1}$), and Data In ($b_n$) and provides test data to the PIN Electric circuits PEI through PEN via leads $S_1'$ through $S_n'$. As explained earlier herein, during a Test Serial operation, the test data is shifted in the Shift Register Means and the count of the number of serial test steps, or cycles, called for is maintained and controlled thereby. Namely, for each shift of the test data, the number of serial tests to be performed is decremented by one by shifting the logical one in the NST portion of the Shift Register Means.

Operational Codes of the Tester (FIG. 10)

FIG. 10 sets forth the operational codes of the tester, to be called for by the Operational Code Specifying bits from the RAM. The left hand column sets forth the logical content (ones and zeroes) for each of the operational codes of the tester. The center column sets forth the name of each of the operational codes employed in the tester. The right hand column sets forth the Mnemonic for each of the operational codes.

It will be noted, there are sixteen ($2^4$) operational codes available. One, 1100, is a spare, desginated as Test (Spare).

The operational codes requiring the $\bar{a}$ logic condition, namely the first eight in FIG. 10, place the tester in the Set-Up (SU) mode. The operational codes requiring the *ab* logic condition, namely the last four in FIG. 10, place the tester in the Test (T) mode.

For example, the operational code Set-Load, In, Mask is called by the logic condition 0111 or $\bar{a}bcd$. The tester is in the set-up mode ($\bar{a}$) of operation and the Mnemonic is SLIM. Whereas, the operational code Test Parallel (TP) is called for by the logic condition 1111, or *abcd*. The tester is in the test mode (*ab*) of operation and the Mnemonic is TP.

Pin Electronic Circuit (FIG. 6)

FIG. 6 discloses the logical circuit diagram of one of n like PIN Electronic circuits. Test data from each stage of the Shift Register Means is impressed on the input of the PIN Electronic circuit connected thereto.

The operation of the PIN Electronic circuits will be undertaken by utilizing a number of operational codes. There are *n* PIN circuits. One for each stage of the Shift Register Means.

For any of the operational codes under the SET-UP (SU) Mode of operation of the tester the logic condition $\bar{a}$ will be present. Under SET-UP Mode, AND circuit 11 of FIG. 6 will be conditioned by a *y*-time pulse, when a logical one of test data is impressed on the PIN circuit input. Thus at *y*-time the clock input of each of the polarity latches 22, 23 and 24 will be conditioned, thereby causing the output of each of these latches to respectively assume the polarity (UP or Down) of the input thereto at *y*-time. Namely, the output of Latch 22 will be UP, where the test data input to the PIN circuit is a logical one, for the following operational codes:

$\bar{a}\, b\, \bar{c}\, \bar{d}$ or 0100, SET-LOAD, Out, $\overline{\text{Mask}}$ (SL$\overline{\text{IM}}$);
$\bar{a}\, b\, \bar{c}\, d$ or 0101, SET-LOAD, Out, Mask (SL$\bar{\text{I}}$M);
$\bar{a}\, b\, c\, \bar{d}$ or 0110, SET-LOAD, IN $\overline{\text{Mask}}$ (SLI$\bar{\text{M}}$); and
$\bar{a}\, b\, c\, d$ or 0111, SET-LOAD, In, Mask (SLIM). The UP output of Latch 22 closes switches 32 and applies the load, represented as a resistor connected between switch 32 and potential source $V_4$, to the pin of the device under test. As schematically represented in FIG. 6, the load is applied via switch 32 connection $J_1$ and switch 34 to the pin of the device under test.

The Operational code 0100, SET-LOAD, OUT, $\overline{\text{MASK}}$, (SL$\overline{\text{IM}}$) as recited above, applies a load to the pin of the device under test.

The Operational code 0101, SET-LOAD, OUT, MASK, (SL$\bar{\text{I}}$M) as recited above, applies a load to the pin of the device under test. Also, the presence of the *d* bit of the operational code specifying bits causes the output of Latch 24 to assume the UP level at *y*- time. The UP output level of Latch 24, via Inverter 18, impresses a DOWN input on AND circuit 19. This precludes AND circuit 19 from being conditioned. Thus the Operational code SL$\bar{\text{I}}$M Masks the rendition of a GO/NO GO electrical manifestation.

The Operational code 0110, SET-LOAD, IN, $\overline{\text{MASK}}$, (SLI$\bar{\text{M}}$) as recited above, applies a load to the pin of the device under test. Also, the presence of the *c* bit of the operational code specifying bits causes the output of Latch 23 to assume the UP level at *y*-time. The UP output level of Latch 23 conditions the lower input of AND circuit 28, and via Inverter circuit 17 impresses a DOWN level on the center input of AND circuit 19. This precludes AND circuit 19 from being conditioned. The UP output of Latch 23 also closes switch 33 connecting Driver 29, as schematically represented, through switches 33 and 32 to the load and through switches 33 and 34 to the pin of the device under test. Thus the Operational code SLIM connects the Driver 29 to the DUT pin, applies the Load to the DUT pin, and unmasks the rendition of the GO/NO GO manifestation.

The Operational code 0111, SET-LOAD, IN MASK (SLIM), as recited above, applies a load to pin of the device under Test (DUT). Also, the presence of the *c* and *d* bits of the Operational code specifying bits respectively cause the outputs of Latches 23 and 24 to assume the UP level at y-time. The UP output level of Latch 23 conditions the lower input of AND circuit 28, and via Inverter circuit 17, impresses a DOWN level on the center input of AND circuit 19. The UP output level of Latch 24, via Inverter 18, impresses a DOWN input of AND circuit 19. The UP output of Latch 23 also closes switch 33. This connects Driver 29, as schematically represented, through switches 33 and 32 to the load, and through switches 33 and 34 to the pin of the device under test. Thus the operational code SLIM connects the Driver 29 to the DUT pin, applies the load to the DUT pin, and masks the rendition of the GO/NO GO manifestation.

Now it will be apparent from FIG. 10 that the SET-UP mode operational codes (the first eight in FIG. 10) containing $\overline{a}\,b$ --, namely 01 --, the load is set, whereas for codes containing $\overline{a}\,\overline{b}$--, namely 00 --, the load is not set.

Considering now the Operational codes containing $\overline{a}\,b$, it will be apparent from FIG. 10 that AND circuit 11 will be energized at *y*-time, where a logical one is impressed on the pin circuit input. The output of Latch 24 will rise to the UP level at *y*-time when a *d* bit is present. The output of Latch 23 will rise to the UP level at *y*-time when a *c* bit is present. The output of Latch 22 will rise to the UP level at *y*-time when a *b* bit is present.

The Operational Code 0000 SET-$\overline{\text{LOAD}}$,OUT,$\overline{\text{MASK}}$. (S$\overline{\text{LIM}}$)

When a logical one is impressed on the input of the pin circuit, the clock inputs of Latches 22,23 and 24 will be conditioned at *y*-time, via AND circuit 11. AND circuit 11 is conditioned by a "$\overline{a}y$" input and a logical one bit input.

The Operational Code 0001 SET-$\overline{\text{LOAD}}$ OUT, MASK. (S$\overline{\text{LI}}$M)

At *y*-time the output of Latch 24 will rise in response to the presence of the *d* bit. The UP output of Latch 24, via Inverter 18, will impress a DOWN level on the lowest input of AND circuit 19. Thereby precluding AND circuit 19 from being energized.

The Operational Code 0010, SET-$\overline{\text{LOAD}}$,IN, $\overline{\text{MASK}}$. (S$\overline{\text{L}}$I$\overline{\text{M}}$)

At *y*-time the output of Latch 23 will rise in response to the presence of the *c* bit. The UP output of Latch 23 will cause, switch 33 to close, the lower input of AND circuit 28 to be conditioned, and via Inverter Circuit 17, the center input of AND circuit 19 to be deconditioned. Thereby precluding AND circuit 19 from being energized.

The Operational Code 0011, SET-$\overline{\text{LOAD}}$, IN, MASK. (SLIM)

At *y*-time the output of Latches 23 and 24 will rise to the UP level respectively in response to the presence of the *c* and *d* bits. The UP output of Latch 24, via Inverter 18, will impress a Down level on the lowest input of AND circuit 19. The UP output of Latch 23 will cause, switch 33 to close, the lower input of AND circuit 28 to be conditioned, and, via Inverter circuit 17, the center input of AND circuit 19 to be conditioned.

The Operational code 1100 TEST (SPARE) may be implemented as required.

The Operational Code 1011, SET Clock 1 (SCl)

The operational command, or instruction, SCl in response to operational code specifying bits abcd, conditions the clock of Latch 35 (FIG. 6) at *y*-Time. In the presence of a logical one of test data being impressed on the PIN circuit input from the Shift Register Means, the output of Latch 35 will rise to the UP level. The UP output of Latch 35 conditions one input of ANd circuit 36, whereby during a TEST SERIAL operation (TS), Clock 1 pulses are impressed on one input of Exclusive OR CIRCUIT 37. Thus when Latch 25 (FIG. 6) has a logical one stored therein a negative Clock 1 pulse will be impressed on the input of Driver 29 during every test step, or cycle of the TEST SERIAL operation. Correspondingly when Latch 25 (FIG. 6) has a logical zero stored therein a positive Clock 1 pulse will be impressed on the input of Driver 29 during every test step, or cycle of the TEST SERIAL operation.

The Operational Code 1000, SET Number of SERIAL TESTS (SNST)

As explained earlier herein the code 1000 is decoded by the Decoder (FIG. 8) and provides an SNST command. The SNST command is impressed on the clock input of Latch 53 of the NST portion of each stage of the Shift Register Means. The SNST command controls the storing of a logical one in Latch 53 of a predetermined stage of the Shift Register Means. It will be appreciated that only a single Latch 53 of a predetermined stage of the Shift Register Means will receive a logical one input concurrently with the SNST command.

The Operational Code 1001,SET PIN SERIAL (SPS)

The command SPS, in response to the logical content $a\overline{b}\,\overline{c}d$ conditions to clock input of Latch 21 (FIG. 6) at *y*-time. In the presence of a logical one of test data being impressed on the input to the pin circuit the output of Latch 21 will rise to the UP level at *y*-time. The UP output of Latch 21, via OR circuit 16, conditions inputs of AND circuits 19 and 28, respectively. It will be appreciated that customarily only a single Latch 21 of a predetermined stage of the Shift Register Means will receive a logical one input concurrently with the SPS command.

The Operational Code 1010 SET DISCONNECT (SD)

When the Operational code calls for SET DISCONNECT, namely the logical combination $a\overline{b}c\overline{d}$ for clock input of Latch 20 (FIG. 6) is set at *y*-time. When the data input to the PIN CIRCUIT is a logical one, the output of Latch 20 will rise to the UP level. The UP output of Latch 20, via Inverter circuit 15, impresses a DOWN condition on the control of switch 34. When a DOWN input is impressed on the control input of Switch 34 the Switch opens, and thereby disconnects the pin of the device under test from the PIN Electronic circuit.

The Operational Code 1101, Test Tester (TT)

The Operational code 1101 is decoded by the Decoder of FIG. 8. AND circuit 91 of the Decoder provides as an output the command TEST TESTER (TT). AND circuit 85 of the Decoder is conditioned by the *ab* bits and provides an output stating that the tester is in the Test (T) mode. The Test Tester command, via OR circuit 27 (FIG. 6), conditions the upper input of AND circuit 31 of the Pin circuit (FIG. 6). The Test mode electrical manifestation from AND circuit 85 is impressed on and conditions the lower input of AND circuit 12, the lower input of AND circuit 31 and the upper input of AND circuit 14. An electrical manifestation of a test bit representing a logical one will, via Exclusive OR circuit 13, set a logical one in Latch 26 at strobe time. This occurs since the strobe time pulse, via AND circuit 14, is applied to the clock input of Latch 26 when the output of Exclusive OR circuit 13 is up. AND circuit 31 is conditioned by the UP output of Latch 26 and provides an electrical manifestation, namely a logical one, or UP level, on the GO/NO-GO line of the Pin circuit.

The Operational Code 1111, Test Parallel.

The Code 1111 causes AND circuit 89 of the Decoder to issue the command Test Parallel (TP). This command, via OR circuit 16, is impressed on and conditions the upper input of AND circuits 19 and 28, respectively.

Now for purposes of explanation assume the following conditions. Prior to the current Test parallel operation the tester, in the set-up mode, has executed the Operational Code 0010, Set-$\overline{\text{LOAD}}$, IN, $\overline{\text{MASK}}$. As explained earlier the SLIM operation sets a logical one in Latch 23. With the output of Latch 23 UP the following conditions exist in the Pin circuit of FIG. 6; switch 33 is closed; the lower input of AND circuit 28 is conditioned; and the center input of AND circuit 19 is deconditioned.

Now further assume for purposes of explanation that the test bit impressed on the input to the PIN circuit during the TEST PARALLEL operation is a logical zero. Thus a DOWN level electrical manifestation is impressed on the DATA input of Latch 25.

It will now be apparent that AND circuit 28 is conditioned. The output of AND circuit 28 conditions the upper input of AND circuit 12. The lowest input of AND circuit 12 is conditioned since the tester is in the TEST (T) mode. The center input of AND circuit 12 is conditioned by a Drive-Time pulse. The output of AND circuit 12 is impressed on the clock pulse of Latch 25. Thus at Drive-Time the output of Latch 25 will be at a Down level, manifesting that the test bit for the Pin circuit was a logical zero. The DOWN output of Latch 25 is coupled via Exclusive OR circuit 37 to the Driver 29. (The second input Exclusive OR circuit 37 is DOWN since AND circuit 36 is deconditioned by the absence of a TS command.) In response to the DOWN level output of Latch 25 the Driver 29 impresses, or drives, an electrical manifestation representative of a logical zero on the pin of the device under test. Namely, as represented in FIG. 6 the potential $V_2$ is impressed via switches 33 and 34 on the Pin of the Device under Test. Note, if the test bit had been a logical one an electrical manifestation of a logical one would have been impressed on the pin of the device under test. In FIG. 6 the potential $V_1$ is represented as the electrical manifestation of a logical one impressed on the pin of the device under test.

Typical methods for setting the values of $V_1$ and $V_2$ are well known in the art. Driver circuits for providing appropriate $V_1$ and $V_2$ potentials in response to UP and Down level inputs are also well known in the art. Applicant's illustrative embodiment of his invention may be practiced with any one of a number of prior art driver circuits known in the art. No detailed discussion of Driver 29 is deemed to be required. However, it is to be appreciated as known in the art, Driver 29 may have the magnitudes of $V_1$ and $V_2$ respectively set by the controller, or they may be respectively set at the pin circuits.

The Operational Code 1110 TEST SERIAL (TS)

The Operational Code 1110 Test Serial is decoded by the Decoder and AND circuit 90 thereof is conditioned. As explained earlier herein, the conditioning of AND circuit 90, FIG. 8, directly and indirectly, results in the following electrical manifestations being conveyed to the Shift Register Means: UP level TS command; Down level $\overline{\text{TS}}$ command; a series of $Y_1$ pulses; a Z pulse; and a $\overline{\text{Z}}$ pulse. At the completion of a TEST SERIAL Operation an SST (Stop Serial Test) command will be received by the Decoder from the Shift Register Means. The operation of the Shift Register Means in executing a SERIAL TEST operation is fully and in detail set forth earlier herein.

Now assume that prior to the current TEST SERIAL operation a SET PIN SERIAL operation has been executed by the tester. The SET PIN SERIAL operation will have set Latch 21 in any predetermined one of the n Pin circuits. Namely, the Pin circuit that is sto receive a series of test bits (one per test step) during a TEST SERIAL operation. There may be as many as *n* test bits in the series of test bits. The test bit series may be any sequence of logical ones and/or logical zeroes, as dictated by the test requirements of the devices under test.

Assume merely for purposes of explanation that Latch 21 of PIN CIRCUIT PEN, shown in FIG. 6, has a logical one stored therein by an earlier SET PIN SERIAL operation. As explained earlier, during an SPS operation Latch 21 is set by a logical one being impressed on the pin circuit input in the presence of the SPS command, (a$\overline{\text{bc}}$d) at *y*-time. The UP output of the Latch 21 via OR circuit 16, conditions the upper input of AND circuit 19 and the upper input of AND circuit 28.

Now assume also, that prior to the current TEST SERIAL operation, the tester was set-up by the execution of a SET-LOAD, IN, $\overline{\text{MASK}}$ (0010). As explained earlier herein a S$\overline{\text{LIM}}$ operation due to the presence of the C bit sets Latch 23. The UP level output of Latch 23, closes switch 33, via Inverter circuit 17 deconditions the center input of AND circuit 19, and conditions the lower input of AND circuit 28.

Thus at the initiation of the current TEST SERIAL operation the pin circuits have been set. Namely, only PIN circuit PEN shown in FIG. 6 will respond to, or accept a test data input. (Note, only PIN circuit PEN has Latch 21 set.)

The following conditions exist in PIN circuit PEN at the initiation of TEST SERIAL: Latch 21 is set; Latch 23 is set; AND circuit 28 is conditioned; the upper input of AND circuit 12 is conditioned; and switch 33 is closed.

For purposes of explanation consider a TEST SERIAL operation which has one hundred test steps, or cycles, and the series of test bits comprises alternate electrical representations of logical "ones" and zeroes. Namely, the test bit is a logical "one" for the 1st, 3rd, 5th, 7th-----95th, 97th and 99th test steps, and the test bit is a logical zero for the 2nd, 4th, 6th, 8th-----96th, 98th and 100th test steps.

Now referring to FIG. 6 it will be apparent that during test steps 1, 3, 5, 7----95, 97 and 99, Driver 29 will drive an electrical manifestation of a logical one on the $n^{th}$ pin of the device under test. Namely during each odd numbered test step the data input of Latch 25 has a logical one electrical manifestation impressed thereon.

As stated earlier the upper input of AND circuit 12 is conditioned. The lower input of AND circuit 12 is conditioned since the tester is in the TEST (T) mode of operation. The center input of AND circuit 12 is conditioned by a Drive Time pulse during each test step. Thus, at drive time of each odd numbered test step of the TEST SERIAL operation the output of Latch 25 will assume the UP level. Driver 29 in response to an UP level input from Latch 25 will drive a logical one electrical manifestation via closed switches 33 and 34 to the pin of the device under test. Namely, in this example, the pin of the device under test which is connected to PIN circuit PEN.

It will now be apparent that at drive-time of each odd numbered test step, of said one hundred test steps, the output of Latch 25 will assume an UP level, and at drive-time of each even numbered test step, of said one hundred test steps, the output of Latch 25 will assume a DOWN level. The Driver 29, in response to an UP level, impresses a first electrical condition or manifestation, in the instant case a potential, on the $n^{th}$ pin of the device under test. The Driver 29, in response to a DOWN level, impresses a second electrical condition or manifestation, in the instant case, a potential on the $n^{th}$ pin of the device under test.

The first and second electrical conditions, or manifestations, recited as provided by the driver, may be any one or a combination electrical parameters, such as current, phase, voltage, impedance, capacitance or the like. In applicant's preferred embodiment the Driver 29 provides first and second potentials namely $V_1$ and $V_2$, where $V_1$ may be chosen to be greater, lesser or equal in magnitude to $V_2$.

The above examples of the operation of applicant's tester, as will be readily apparent to those persons skilled in the art, are illustrative, and are not intended to be fully representative of the full utility of applicant's tester.

Now referring to FIG. 6, consider the case where the PIN circuit is connected to an output PIN of the device under test. Assume further that the output PIN of the device under test requires a load to be applied thereto. The operational code SET-LOAD, OUT, $\overline{\text{MASK}}$ (0100) SL$\overline{\text{IM}}$ will have been executed during set-up. The *b* bit of SL$\overline{\text{IM}}$ will have set Latch 22. With Latch 22 set, switch 32 will be closed. Thus the load is applied via switches 32 and 34 to the output pin of the device under test.

In FIG. 6 the input of Detector 30 is connected via junction $J_1$, through switch 34 to the output pin of the device under test. During a test step, which may be a test step under a TEST SERIAL, or TEST PARALLEL operation, the output of the device under test electrically manifested at the output pin connected to switch 34 of FIG. 6 will be impressed on the input of Detector 30. Detector 30 will provide as an output, an electrical manifestation of a logical one in response to an input having a magnitude equal to, or greater than $V_3$. Detector 30 will provide, as an output, an electrical manifestation of a logical zero in response to an input having a magnitude less than $V_3$.

The output of Detector 30 is impressed on the first of the two inputs of Exclusive OR circuit 13. The output of Exclusive OR circuit 13 is impressed on the data input of Latch 26. The clock input of Latch 26 is conditioned, via AND circuit 14, at STROBE-Time. Thus, the output of Latch 26 will be UP when the output from the output pin of the device under test is equal to, or greater than $V_3$ and the test data input to Exclusive OR 13 is a logical zero. The output of Latch 26 will be DOWN when the output from the output pin of the device under test is less than $V_3$ and the test data input to Exclusive OR 13 is a logical zero. (Referring to Exclusive OR circuit 13, when both inputs thereof are UP, or when both inputs thereof are DOWN, the output of Latch 26 will be DOWN indicating a GO condition. When the output of Latch 26 is UP a NO-GO condition is indicated.) The output of Latch 26, namely an electrical manifestation of a logical one or logical zero, as the case may be, will be manifested, via AND circuit 31, on the GO/NO-GO line shown in FIG. 6.

The switches 32, 33, 34, may respectively be any one of a number suitable switch structures well known in the art. Switches 32, 33, 34 may respectively be F.E.T. type switches well known in the art. Preferably the switches 32, 33, 34 will respectively be F.E.T. switches generally as described in the afore-identified co-pending patent application of Michael J. Patti.

The load is schematically represented in FIG. 6 as a potential $V_4$ connected through a resistor. It is merely representative. $V_4$ may have any value including zero. The resistor may be considered to represent an impedance, a capacitance, an inductance or any function thereof. The form of the load (resistance, capacitive, etc.) and the magnitude of $V_4$ are dictated by the technology of the device under test and the desire to rigorously and effectively test said device in an efficient manner.

All *n* pin circuits in the disclosed embodiment are stated and represented to be identical. It will be appreciated that such is not a requirement for the practice of applicant's invention. Applicant's invention may be practiced with *n* pin circuits varying one from the other in function, or logical content, or technology employed. The pin circuits must meet the needs of the tester as dictated by the objective to effectively and efficiently test the device under test.

The GO/NO-GO signals provided by the pin circuits are preferably conveyed to the Controller for storage, analysis and/or processing. They may be conveyed on a per pin, per test step basis, or any manner that aids in the efficient effective testing of the device under test. The GO/NO-GO signals from a number of pin circuits, or all pin circuits connected to output pins of the device under test, may be ORred together and a single GO/NO-GO signal sent to the Controller.

FIG. 9 discloses a number of selected idealized waveforms certain of which occur during each test cycle, and others of which occur only during certain test cycles.

These waveforms may be considered a general summary. Although not in the form presented in FIG. 9, the substance and significance of each of the waveforms has already been fully discussed in detail disclosed herein.

Waveform $W_{f1}$ illustrates test data being impressed on the inputs of the Shift Register Means for essentially the full duration of a test cycle, or step. Waveform $W_{f1}$ further illustrates the impressing of the associated operational code specifying bits, as explained earlier herein, on the Decoder and PIN circuits for essentially the full duration of each test step.

Waveform $W_{f2}$ discloses the relative timing within a test cycle of the following: a SET-UP (SU) mode electrical manifestation occurring only during each test cycle executing any one of the SET-UP operational codes; a SET Disconnect (SD) electrical manifestation occurring only during a test cycle employed to execute the operational code SET Disconnect (SD); a SET PIN SERIAL (SPS) electrical manifestation occurring only during a test cycle employed to execute the operational code SET PIN SERIAL; or a SET Clock 1 (SC1) electrical manifestation occurring only during a test cycle employed to execute the operational code SET Clock 1.

Waveform $W_{f3}$ discloses the relative timing of the $x$-time, or $x$ pulse within each test cycle.

Waveform $W_{f4}$ discloses the relative timing of the $y$-time, pulse within each test cycle. Waveform $W_{f4}$ further discloses the relative timing of the $Y_1$ pulse which occurs only during each test step of a TEST SERIAL Operation.

Waveform $W_{f5}$ discloses the relative timing of the Z pulse (also the $\overline{Z}$ pulse) which occurs only during the first test step of a TEST SERIAL Operation.

Waveform $W_{f6}$ discloses the relative timing of the Drive-Time pulse of each Test cycle.

Waveform $W_{f7}$ discloses the relative timing of the Strobe-Time pulse of each Test cycle.

Waveform $W_{f8}$ discloses the relative timing of the Clock 1 pulse of each test cycle.

Applicant has described in detail a preferred embodiment of his invention in addition to the detailed description of a general embodiment of his invention. From the teaching of applicant's invention contained herein numerous modifications to applicant's invention will be apparent to those skilled in the art, without departing from the practice of applicant's invention.

While this invention has been particularly described with reference to the preferred embodiments thereof, it will be understood by those skilled in the art that the foregoing and other changes in form and detail may be made without departing from the spirit and scope of the invention.

What is claimed is:

1. An electronic test system for testing high density logic networks, said networks having $n$ contact pins, each of said contact pins having associated therewith a function, where $n$ is an integer having any value in the range of one hundred through five hundred, said test system employing at least one test pattern under control of a system test program, said test pattern including at least $m$ test steps and each said test step utilizing a discrete test word having $n$ discrete electrical manifestations of logical ones and/or logical zeros, where $m$ is an integer having any value in the range of one hundred to one thousand, said test system including: a system controller operative under control of said test program for monitoring and controlling each test step of said test pattern, said system controller including bulk storage means for storing test data; a word oriented random access memory coupled to said system controller and having a capacity capable of storing $z$ words of test data, where each word of test data has $n$ discrete binary bits of test data and $z$ is an integer less than said integer $m$ in magnitude, said word oriented random access memory including operational code specifying means for specifying an operational code for each word of test data stored in said word oriented random access memory; $n$ pin circuits each having at least a test data input, and an output, each of said pin circuits being settable to perform any one of a plurality of functions, each of said $n$ outputs of said $n$ pin circuits being connected to a discrete one of said $n$ contact pins of a network under test; a closed loop high speed shift register having $n$ stages, each stage of said shift register having at least an input coupled to a particular binary bit position of each of said $z$ word storage positions of said word oriented random access memory, and an output coupled to a predetermined one of said $n$ test data inputs of said $n$ pin circuits; decode circuitry intercoupling said system controller, said operational code specifying means, said shift register and each of said $n$ pin circuits, said decode circuitry being adapted to, during each test step, in response to an input from said operational code specifying means, and under control of said system controller, selectively control at least each of said $n$ pin circuits and said shift register, whereby during each of said $m$ test steps an $n$ bit binary word is impressed on said $n$ contact pins of a network under test, and whereby said word oriented random access memory contains in said $z$ word storage positions thereof all of the test data required to subject a network under test to a test pattern having $m$ test words.

2. An electronic test system in accordance with claim 1 wherein said word oriented random access memory is a solid-state device, said operational code specifying means has the capacity to store a discrete manifestation of an operational code for each test data word, and each said operational code is manifested by a plurality of operational code specifying binary bits.

3. An electronic test system in accordance with claim 2 wherein said decode circuitry comprises circuit means including logical circuit means for receiving said operational code specifying binary bits and at least one timing signal from said system controller, said circuit means including means for electrically manifesting to each of said $n$ pin circuits and said shift register at least certain operations called for by said operational code specifying binary bits.

4. An electronic test system in accordance with claim 1 wherein each operational code specified by said operational code specifying means is manifested by a plurality of binary bits, and where there is a discrete operational code for at least one of the following opertion: SET NUMBER OF SERIAL TESTS; SET PIN SERIAL; TEST SERIAL; TEST PARALLEL; TEST TESTER; SET CLOCK 1; SET DISCONNECT; SET-$\overline{\text{LOAD}}$, OUT, $\overline{\text{MASK}}$; SET-$\overline{\text{LOAD}}$, OUT, MASK; SET-$\overline{\text{LOAD}}$, IN, $\overline{\text{MASK}}$; SET-$\overline{\text{LOAD}}$,IN,MASK; SET-LOAD,OUT,$\overline{\text{MASK}}$; SET-LOAD, OUT, MASK; SET-LOAD, IN, $\overline{\text{MASK}}$; and, SET-LOAD, IN, MASK.

5. An electronic test system in accordance with claim 1 wherein said operational specifying means specifies each operational code by a discrete binary word having at least four binary bits whereby at least sixteen discrete binary words are available to respectively specify an operational code, and at least one or more of the following operational codes are respectively specified by a discrete one of said binary words, SET number of SERIAL TESTS, SET PIN SERIAL, TEST SERIAL and TEST PARALLEL.

6. An electronic test system as claimed in claim 5 wherein said decode circuitry includes: first circuit means for receiving said binary bits calling for a specific operational code; second circuit means adapted to receive at least one series of timing pulses from said controller and at least one input from said shift register; third circuit means intercoupling said first and second circuit means and including logic means; a first group of outputs of said decode circuitry interconnecting said third circuit means and said shift register; a second group of outputs of said decode circuitry interconnecting said third circuit means and said $n$ pin circuits, whereby each of said $n$ pin circuits and said shift register function in accordance with the operational codes called for by the operational code specifying bits.

7. In a test method for testing a large scale integration device having $n$ terminals, where $n$ is an integer having any value in the range of one hundred through five hundred, said method including $m$ discrete test steps, each test step of said $m$ test steps including the impressing of a discrete $n$ binary word bit on said $n$ terminals, where $m$ is an integer having any value in the range of one hundred through one thousand, said method employing test apparatus including test system controller means, word oriented random access storage means, $n$ discrete pin circuit means coupled to $n$ pins of a device under test, and binary word assembly means, said method comprising the steps of:

a. conditioning each of said $n$ pin circuit means to perform a discrete one of a plurality of functions, where said functions include input, output, driver, load, ground and open, and said functions are in accordance with the function of the terminal of the device under test to which the pin circuit is coupled.
b. obtaining during a first test step a first one of said $m$ discrete $n$ binary bit test words from said word oriented random access storage means,
c. impressing said first test word on said $n$ discrete pin circuit means,
d. obtaining during a second test step a predetermined portion of a second one of said $m$ discrete $n$ binary bit test words from said word oriented random access storage means,
e. utilizing said binary word assembly means to construct said second one of said $m$ discrete $n$ binary bit test words from said first test word and said predetermined portion of said second test word,
f. impressing said second test word on said $n$ discrete pin circuit means.

8. In a test method as recited in claim 7 wherein during at least certain of said $m$ test steps, subsequent to said second test step, a predetermined portion of the test word to be employed is obtained from the word oriented random access storage means and said binary word assembly means is employed to construct a discrete $n$ binary bit test word.

9. In a test method as recited in claim 8 wherein during each of said $m$ steps a discrete $n$ binary bit test word is impressed on said $n$ discrete pin circuit means, and during at least certain of said test steps a determination is made as to the merit, or lack of merit of the device under test.

10. In a test method as recited in claim 9 wherein during each of said $m$ test steps an operational code is specified by said test system controller means and where the operation of said test apparatus during each of said $m$ test steps is in accordance with the operational code specified.

11. In a test method as recited in claim 9, wherein said large scale integration device under test comprises high density circuit means, at least one portion of said high density means, circuit requiring at least one serial input of time displaced electrical manifestations for the effective testing of said high density circuit means.

12. In a test method as recited in claim 9 wherein at least one of said $n$ terminals of said large scale integraton device requires for effective testing of said large scale integration device the impressing of an electrical manifestation varying in time, in a prescribed manner.

13. In a test method as recited in claim 9 wherein certain of said $m$ test steps are devoted to applying serial test data to said device under test and others of said $m$ test steps are devoted to applying parallel test data to said device under test.

14. In a test method as recited in claim 13 wherein each of said $n$ pin circuits means is settable to perform one of the afore-identified functions, a plurality of said pin circuit means set to perform an output function, at least one of said plurality of output pin circuit means being adapted to receive an electrical manifestation varying in time in an anticipated prescribed manner from said device under test during at least a certain consecutive number of said $m$ test steps.

15. In a test method as recited in claim 9 wherein during the execution of certain ones of said $m$ test steps said test apparatus is operating in a Set-UP MODE, and during other ones of said $m$ test steps said apparatus is operating in a TEST MODE.

16. In a test method as recited in claim 15 wherein during each of said $m$ test steps, where said test apparatus is operating in the TEST MODE, a determination is made as to the merit or lack of merit of the device under test.

17. In a test method as recited in claim 15 wherein during at least one or more of said $m$ test steps where said test apparatus is operating in the TEST MODE said test apparatus is executing a self imposed test.

18. In a test method as recited in claim 15 wherein during at least certain of said $m$ test steps where said test apparatus is operating in the Set-UP MODE at least certain of said $n$ Pin circuit means are set-up to perform a predetermined function.

19. An electronic tester operative under control of a computer system for testing high circuit density devices, said tester including: storage means responsive in said computer system for storing a first integer number of discrete test data words of a given length and a second integer number of selected portions of discrete data words of said given length; settable circuit means coupled to a high circuit density device under test and adapted to successively receive a test data word of said given length; word construction circuit means coupling said storage means to said settable circuit means and responsive to said computer system, said word construction circuit means being adapted to construct a third integer number of discrete test data words of said given length from said first integer number of discrete data words and said second integer number of selected portions of discrete data words, where said third integer number is equal to the sum of said first and second integer numbers; and said word construction circuit means including circuit means for successively impressing each of said third integer number of discrete test data words on said settable circuit means, whereby the test data storage capacity of said storage means may be less than the storage capacity required to store said third integer number of discrete test data words.

20. An electronic tester for testing large scale integration devices, said devices having $n$ contact pins, where $n$ is an integer having a magnitude of at least one hundred, said tester being under control of a computer system, said tester comprising: a solid state word oriented random access memory responsive to said computer system, said memory having $k$ binary word storage positions, each of said word storage positions having a binary bit positions for storing test data, and $x$ binary bit positions for storing control data, where $k$ is an integer having a magnitude of at least four hundred and $x$ is an integer having a magnitude of at least four; controllable shift register means coupled to said memory and adapted to store $n$ binary bits, said shift register means being adapted to successively receive $n$ binary bits of test data from said memory; $n$ pin circuits means coupled to said controllable shift register means and said n contact pins of a device under test; control means for controlling said shift register means and each of said n pin circuit means, said control means interconnecting said shift register means and said $n$ pin circuit means, said control means cooperating with said computer system and being successively responsive to binary values obtained from said $x$ binary bit positions of successive ones of said $k$ binary word positions of said memory, whereby a multiple of $k$ $n$ binary bit words of Serial/Parallel test data may be stored in said $k$ binary word storage positions of said word oriented random access memory.

21. An electronic tester for testing an electronic device having n terminals, said $n$ terminals including, y input terminals for accepting electrical manifestations as inputs, $z$ output terminals for electrically manifesting outputs, and $p$ parameter terminals for accepting electrical energy source manifestations, where the sum of $y$, $z$ and $p$ is equal to $n$, and $n$ is an integer having any value in the range of one hundred to five hundred, said tester being operative under control of a test program having at least $m$ test steps and at least one test pattern, each said test pattern including $m$ discrete words, each of said $m$ test steps utilizing a distinct one of said $m$ discrete words, each of said $m$ discrete words containing $n$ binary bits, where $m$ is an integer having any value in the range one hundred to one thousand, said test including: a system controller having storage means for storing $m-k$ of said m words and $k$ word portions, where $k$ is any integer in the range of zero through $m-l$; electronic means coupling said storage means to said n terminals of said device under test; additional means under control of said system controller and cooperating with said storage means and said electronic means to impress during each test pattern step, then $n$ binary bits of a discrete one of said $m$ words on said $n$ terminals of said device under test; said electronic means including word construction means responsive to said additional means for providing to said electronic means during each of said $m$ steps a discrete $n$ binary bit word containing $n$ discrete electrical manifestations of a binary one or zero, said word construction means in cooperation with said additional means utilizing said $n$ binary bits of at least one of said $m-k$ of said m words to construct said $k$ word portions into $k$ discrete words having $n$ binary bits, whereby a discrete binary word having $n$ discrete electrical manifestations representing binary ones and/or zeros is impressed on said $n$ terminals of said device under test during each of said $m$ test steps.

22. An electronic tester operative under control of a computer system for testing large scale integration devices, said tester including: word oriented random access storage means coupled to said computer system; shiftable data storage means coupled to said word oriented random access storage means; settable circuit means intercoupling said shiftable data storage means and a large scale integration device under test; and control means responsively coupled to said computer system, said control means coupled to said shiftable data storage means and said settable circuit means for controlling the operation of said tester, whereby said tester will subject said device under test to a test pattern having a greater number of test data words than said random access word oriented storage means has capacity to store.

23. An electronic test system for testing devices fabricated by large scale integration techniques, said devices having $n$ contact pads, each of said $n$ contact pads having a function associated therewith such as one of the following, data input, data output, energy source input, gate output, gate input, clock output, clock input, etc., where $n$ is an integer equal to at least fifty, said electronic test system employing at least one test pattern under control of a system test program, said test pattern including at least $m$ test steps and each of said m test steps utilizing a discrete test word having $n$ discrete electrical manifestations of logical ones and/or zeros, where $m$ is an integer having any value in the range of one hundred to one thousand, said test system including: a system controller operative under control of said test program for overall monitoring and controlling of each test step of said test pattern, said system controller including bulk storage means for storing test data; a solid state word oriented random access memory coupled to said system controller and having a capacity capable of storing $z$ binary words in $z$ binary word positions of storage, each of said $z$ word positions of storage of said random access memory including one through $n$ binary bit positions for storing $n$ binary bits of test data and at least four binary bit positions for storing operational code specifying bits for manifesting the operation to be executed by said test system for the associated n binary bits of test data, where $z$ is an integer; $n$ settable pin circuits each having a data input and an output, each of said n pin circuits including settable means for setting the function of said pin circuit; connection means connecting each of said n outputs of said $n$ pin circuits to a discrete one of said $n$ contact pads of said device under test; high speed recirculating shift register means having one through $n$ stages, each stage having an input and an output, each stage intercoupling discrete first and second ones of said $n$ stages, each stage being adapted and controllable to store a binary bit of data and to shift said binary bit of data to either said discrete first one, or said discrete second one coupled to said stage; auxiliary means coupled to said high speed recirculating shift register means for receiving and storing an indication of the number of stages binary data stored in said shift register means is to be shifted, said auxilliary means also being adapted to provide a manifestation when the binary data stored in said shift register means has been shifted the number of stages called by said indication: connection means connecting said $n$ inputs of said n stages of said shift register means and said word oriented random access memory and connecting said $n$ outputs of said n stages of said shift register means and said $n$ inputs of said n pin circuit means; decode circuit means intercoupling said system controller, said word oriented random access memory, said shift register means, auxiliary means and said $n$ pin circuit means, specifying bits from said word oriented random access memory and to cause said test system to execute the operation specified by said operational code specifying bits.

24. An electronic test system as recited in claim 23 wherein said high speed recirculating shift register means is a closed loop binary shift register having $n$ stages, said shift register being adapted to receive in parallel an input word having $n$ binary bits and provide in parallel an output word having $n$ binary bits, where said output word is said input word shifted zero, one, or more, shift register stages, said shift register including: $n$ binary stages; each of said $n$ binary stages having, a data stage input terminal, a data stage control terminal, a data interstage input terminal, a data interstage control terminal, an interstage output terminal, a stage output terminal, a register accept data control terminal, and a shift data control terminal; a first AND circuit having a first input connected to said data stage input terminal, a second input connected to said data stage control terminal, and an output; a second AND circuit having a first input connected to said data interstage control terminal, a second input connected to said data interstage input terminal, and an output; an OR circuit having a first input connected to said output of said first AND circuit, a second input connected to said output of said second AND circuit, and an output; a first settable latch circuit having a first-input connected to said output of said OR circuit, a second input connected to said register accept data control terminal, and an output connected to said stage output terminal; a second settable latch circuit having a first input connected to said output of said first settable latch circuit, a second input connected to said shift data control terminal and an output connected to said data interstage output terminal; n connections respectively connecting said interstage output terminals of said 1st, 2nd, 3rd, 4th, 5th$n-3$, $n-2$, $1-1$ and $n$th stages to said data interstage input terminals of said $n^{th}$ 1,2,3,4 $n$-4, $n$-3, $n$-2 and $n-1^{th}$ stages; first connection means connecting in common the data stage control terminals of said $n$ stages; second connection means connecting in common the data interstage control terminals of said $n$ stages; third connection means connecting in common the register accept data control terminal of said $n$ stages; and, fourth connection means connecting in common the shift data control terminals of said $n$ stages, whereby an n bit binary word impressed on said $n$ data stage input terminals will be accepted by, and stored in said $n$ first settable latches when said first connection means and said third connection means are respectively conditioned by electrical manifestations impressed thereon, and subsequent thereto the $n$ binary bit word stored in said $n$ first settable latches will be shifted one stage from each successive time said second and fourth connection means are respectively conditioned by electrical manifestations impressed thereon.

25. In an electronic test system as recited in claim 23 wherein a first discrete $n$ binary bit word of parallel test data and a second discrete $n$ binary bit word containing serial test data are logically rearranged and reconstructed to provide any number of discrete $n$ binary bit test data words up to a maximum of $n+1$ discrete $n$ binary bit test data words.

26. In an electronic test system as recited in claim 23 wherein said test pattern includes mixed serial/parallel test data.

27. In an electronic test system as recited in claim 23 where $z$ is an integer less than $m$, and said $m$ discrete $n$ binary bit test words are constructed from $z$ n binary bit words stored in said solid state word oriented random access memory.

28. In an electronic test system as recited in claim 27 where said $m$ discrete $n$ binary bit test words consist of mixed serial/parallel test data.

29. In an electronic test system as recited in claim 23, wherein m is greater than $z$ in magnitude, and where a test pattern having $m$ test steps each employing an $n$ binary bit test word is virtually stored in said $z$ binary word storage positions of said solid state word oriented random access memory.

30. An electronic test system as recited in claim 23 further characterized by at least one of said n settable pin circuits being a pin circuit for use in a high speed tester for testing large scale integration devices, where said tester employs at least a plurality of operational code specifying bits, a SET DISCONNECT electrical manifestation, a TEST PARALLEL electrical manifestation, a SET PIN SERIAL electrical manifestation, a TEST TESTER electrical manifestation, a SET-UP mode electrical instruction, a SET CLOCK 1 electrical manifestation, a TEST SERIAL electrical manifestation, a TEST mode electrical instruction, DRIVE TIME pulses, STROBE TIME pulses and CLOCK 1 pulses and provides at least GO/NO-GO pulses, said pin circuits being conditionable to perform a plurality of functions expressly including the following, driver, load, open and ground, said pin circuit comprising: a test data input terminal for accepting test data and a DUT connection terminal for connection to a contact pin, or pad, of a large Scale integration device under test; first, second, third, fourth, fifth, sixth, seventh and eighth settable polarity hold latches, each of said latches having an information input, a control input and an output; first, second and third switches, each of said switches having first and second terminal means and a control input whereby the open or closed status of said switch may be controlled by an electrical condition; first, second and third AND circuits respectively having first and second inputs and an output; fourth, fifth, sixth and seventh AND circuits respectively having first, second and third inputs and an output; first and second EXCLUSIVE OR circuits respectively having first and second inputs and an output; first and second OR circuits respectively having first and second inputs and an output; a settable DRIVER circuit having an input and output, said DRIVER circuit being adapted to provide a first electrical manifestation at said output thereof in response to a first electrical condition impressed on said input thereof and a second electrical manifestation at said output thereof in response to a second electrical condition impressed on said input thereof; a settable DETECTOR circuit having an input and an output, said DETECTOR circuit being adapted to provide as an output a first signal when an electrical status equal or to or less than a predetermined set standard is impressed on the input thereof and a second signal when an electrical status greater than said predetermined set standard is impressed on the input thereof; an electrical load; first connection means connecting in common said data input terminal of said pin circuit, said information input of said first latch, said information input of said second latch, said second input of said first AND circuit, said information input of said sixth latch, said information input of said eighth latch and said second input of said first EXCLUSIVE OR circuit; said control input of said first latch being adapted to receive a SET Disconnect electrical command, a first INVERTER circuit connected between said output of said first latch and said control input of said first switch; second connection means connecting in common said first terminal means of said first, second and third switches and said input of said DETECTOR circuit; third connection means connecting said output of said DRIVER circuit to said second terminal means of said third switch; fourth connection means connecting said second terminal means of said first switch and said DUT connection terminal of said PIN circuit; fifth connection means connecting said second terminal means of said second switch to said electrical load; said first input of said first OR circuit being adapted to receive a TEST PARALLEL electrical command, said control input of said second latch being adapted to receive a SET PIN SERIAL electrical command, said second input of said first OR circuit being connected to said output of said second latch, said output of said first OR circuit being connected to said first input of said fourth AND circuit and said first input of said second AND circuit; said information input of said third latch being adapted to receive an electrical manifestation of a first one of said plurality of Operational Code specifying bits, said output of said third latch being connected to said control input of said second switch; said first input of said second OR circuit being adapted to receive a TEST TESTER electrical command, said output of said second OR circuit being connected to said first input of said sixth AND circuit; said information input of said fourth latch being adapted to receive an electrical manifestation of a second one of said plurality of operational code specifying bits, said output of said fourth latch being connected to the control input of said third switch and the second input of said second AND circuit, a second INVERTER circuit connected between the output of said fourth latch and said second input of said fourth AND circuit; said information input of said fifth latch being adapted to receive an electrical manifestation of a third one of said plurality of operational code specifying bits; a third INVERTER circuit connected between the output of said fifth latch and the third input of said fourth AND circuit; said first input of said first AND circuit being adapted to receive a SET-UP mode electrical instruction, said output of said first AND circuit being connected to the control inputs of said third, fourth and fifth latches; said first input of said fifth AND circuit being connected to said output of said second AND circuit, said second input of said fifth AND circuit being adapted to receive Drive Time pulses, said third input of said fifth AND circuit, said third input of said sixth AND circuit and said first input of said third AND circuit being respectively adapted to receive a TEST mode electrical instruction, said output of said fifth AND circuit being connected to said control input of said sixth latch, said output of said sixth latch being connected to said second input of said second Exclusive OR circuit, and said output of siad second Exclusive OR circuit being connected to said input of said Driver circuit; said first input of said first Exclusive OR circuit being connected to the output of said DETECTOR circuit, the output of said first Exclusive OR circuit being connected to the information input of said seventh latch; said second input of said third AND circuit being adapted to receive STROBE-Time pulses, the output of said third AND circuit being connected to said control input of said seventh latch, the output of said seventh latch being connected to said second input of said sixth AND circuit, and the output of said sixth AND circuit being adapted to provide a GO/NO-GO electrical representation; said control input of said eighth latch being adapted to receive a SET CLOCK ONE command, said output of said eighth latch being connected to said first input of said seventh AND circuit, said second input of said seventh AND circuit being adapted to receive a TEST SERIAL command, said third input of said seventh AND circuit being adapted to receive CLOCK 1 pulses, and said output of said seventh AND circuit being connected to said first input of said second Exclusive OR circuit; whereby said pin circuit is conditionable to perform any one of said plurality of functions respectively in accord with the operation of said tester as called for by said commands and said plurality of operational code specifying bits.

31. An electronic test system as recited in claim 23 wherein said operational code specifying bits during at least one of said m test steps specified the operation SET Disconnect and in response thereto said test system executes the operation SET Disconnect.

32. An electronic test system as recited in claim 23 wherein said operational code specifying bits during at least one of said m test steps specifies the operation SET NUMBER of SERIAL TESTS, and in response thereto said test system executes the operation SET NUMBER of SERIAL TESTS.

33. An electronic test system as recited in claim 23 wherein said operational code specifying bits during at least one of said m test steps specifies the operation SET PIN SERIAL and in response thereto said test system executes the operation SET PIN SERIAL.

34. An electronic test system as recited in claim 23 wherein said operational code specifying bits during at least one of said m test steps specifies the operation SET CLOCK 1 and in response thereto said test system executes the operation SET CLOCK 1.

35. An electronic test system as recited in claim 23 wherein said operational code specifying bits during at least one of said m test steps specifies the operation TEST TESTER and in response thereto said test system executes the operation TEST TESTER.

36. An electronic test system as recited in claim 23 wherein said operational code specifying bits during at least one of said m test steps specifies the operation TEST SERIAL and in response thereto said test system executes the operation TEST SERIAL.

37. An electronic test system as recited in claim 23 wherein said operational code specifying bits during at least one of said m test steps specifies the operation TEST PARALLEL and in response thereto said test system executes the operation TEST PARALLEL.

38. An electronic test system as recited in claim 23 wherein said operational code specifying bits during at least one of said m test steps specifies the operation SET-$\overline{\text{LOAD}}$, OUT, $\overline{\text{MASK}}$ and in response thereto said test system executes the operation SET-$\overline{\text{LOAD}}$, OUT, $\overline{\text{MASK}}$.

39. An electronic test system as recited in claim 23 wherein said operational code specifying bits during at least one of said m test steps specifies the operation SET-$\overline{\text{LOAD}}$, OUT, MASK and in response thereto said test system executes the operation SET-$\overline{\text{LOAD}}$, OUT, MASK.

40. An electronic test system as recited in claim 23 wherein said operational code specifying bits during at least one of said m test steps specifies the operation SET-$\overline{\text{LOAD}}$, IN, $\overline{\text{MASK}}$ and in response thereto said test system executes the operation SET-$\overline{\text{LOAD}}$, IN, $\overline{\text{MASK}}$.

41. An electronic test system as recited in claim 23 wherein said operational code specifying bits during at least one of said m test steps specifies the operation SET-$\overline{\text{LOAD}}$, IN, MASK and in response thereto said test system executes the operation SET-$\overline{\text{LOAD}}$, IN, MASK.

42. An electronic test system as recited in claim 23 wherein said operational code specifying bits during at least one of said m test steps specifies the operation SET-LOAD, OUT, $\overline{\text{MASK}}$ and in response thereto said test system executes the operation SET-LOAD, OUT, $\overline{\text{MASK}}$.

43. An electronic test system as recited in claim 23 wherein said operational code specifying bits during at least one of said m test steps specifies the operation SET-LOAD, OUT, MASK and in response thereto said test system executes the operation SET-LOAD, OUT, MASK.

44. An electronic test system as recited in claim 23 wherein said operational code specifying bits during at least one of said m test steps specifies the operation SET-LOAD, IN, $\overline{\text{MASK}}$ and in response thereto said test system executes the operation SET-LOAD, IN $\overline{\text{MASK}}$.

45. An electronic test system as recited in claim 23 wherein said operational code specifying bits during at least one of said m test steps specifies the operation SET-LOAD, IN, MASK and in response thereto said test system executes the operation SET-LOAD, IN, MASK.

46. An electronic test system as recited in claim 23 wherein said operational code specifying bits during at least two consecutive ones of said *m* test steps respectively specify TEST PARALLEL and TEST SERIAL and in response thereto said test system consecutively executes the operations TEST PARALLEL and TEST SERIAL.

47. An electronic test system as recited in claim 23 wherein said Decode circuit means is a Decode circuit for use in a high speed electronic test system for testing high density circuit devices where said tester performs a number of operations respectively initiated by said operational code specifying bits, said Decode circuit being adapted to receive and respond to four operational codes specifying bits, Y-Time pulses and a STOP SERIAL TEST command in the form of an electrical manifestation, said Decode circuit being adapted to provide a plurality of commands respectively in the form of electrical manifestations, said plurality of electrical manifestations including the following SET NUMBER SERIAL TESTS command, TEST SERIAL command, NOT TEST SERIAL command, TEST MODE command, SET DISCONNECT command, SET PIN SERIAL command, TEST PARALLEL command, TEST TESTER command, a SETUP MODE command, a SET CLOCK 1 command, a STOP RAM command, $Y_1$-Time pulses, Z pulses and $\overline{Z}$ pulses, said Decode circuit being operative during each test cycle of a test operation including a sizeable number of test cycles, where each test cycle of said test system is controlled, at least in part, by one or more of said electrical commands, said Decode circuit comprising: first, second, third and fourth input terminals for respectively receiving said first, second, third and fourth operational code specifying bits, and a fifth input terminal for receiving said Y-Time pulses; first, second, ninth and twelfth AND circuits respectively having first and second inputs and an output; sixth, seventh, eighth and tenth AND circuits respectively having first, second and third inputs and an output; third, fourth, fifth and eleventh AND circuits respectively having first, second, third and fourth inputs and an output; first and second monostable devices respectively having an input and an output; a bistable device having a SET input, a RESET input and an output; an OR circuit having first and second inputs and an output; said first input of said first AND circuit being connected to said first input terminal of said Decode circuit, a first INVERTER circuit connected between said second input terminal of said Decode circuit and said second input of said first AND circuit, and said output of said first AND circut being connected to said first input of said third AND circuit, said fourth input of said fourth AND circuit, said first input of said fifth AND circuit, and said second input of said eleventh AND circuit; said first input of said second AND circuit being connected to said first input terminal of said Decode circuit, said second input of said AND circuit being connected to said second input terminal of said Decode circuit, said output of said second AND circuit being connected to said first input of said sixth AND circuit, said first input of said seventh AND circuit, said first input of said eighth AND circuit, and said third input of said tenth AND circuit, and being adapted to provide said TEST MODE command; a second INVERTER circuit connected between said first input terminal of said Decode circuit and said second input of said ninth AND circuit; a third INVERTER circuit connected between said third input terminal of said Decode circuit and said third input of said first AND circuit, said third input of said fifth AND circuit, and said third input of said eighth AND circuit; a fourth INVERTER circuit connected between said fourth input terminal of said Decode circuit and said fourth input of said first AND circuit, said third input of said second AND circuit, and said third input of said seventh AND circuit; said second input of said third AND circuit being connected to said fifth input terminal of said Decode circuit, said output of said third AND circuit being adapted to provide said SET NUMBER OF SERIAL TESTS command; said first input of said fourth AND circuit being connected to said fifth input terminal of said Decode circuit, said second input of said fourth AND circuit being connected to said third input terminal of said Decode circuit, and said output of said fourth AND circuit being adapted to provide said SET DISCONNECT command; said second input of said fifth AND circuit being connected to said fifth input terminal of said Decode circuit, said fourth input of said fifth AND circuit being connected to said fourth input terminal of said Decode circuit, and said output of said fifth AND circuit being adapted to provide a SET PIN SERIAL command; said second input of said sixth AND circuit being connected to said third input terminal of said Decode circuit, said third input of said sixth AND circuit being connected to said fourth input terminal of said Decode circuit, said output of said sixth AND circuit being adapted to provide said TEST PARALLEL command; said second input of said seventh AND circuit being connected to said third input terminal of said Decode circuit, said output of said seventh AND circuit being connected to said second input of said twelfth AND circuit and said input of said second monostable device, and said output of said seventh AND circuit being adapted to provide said TEST SERIAL command; a fifth INVERTER circuit connected to said output of said seventh AND circuit and said second input of said OR circuit; said set input of said bistable device being connected to said output of said second monstable device, said output of said second monostable device being adapted to provide said Z pulses, said reset input of said bistable device being connected to said output of said first monostable device; said first input of said tenth AND circuit being connected to said fifth input terminal of said Decode circuit, said second input of said tenth AND circuit being connected to said output of said bistable device, said output of said bistable device being adapted to provide said STOP RAM command, and said output of said tenth AND circuit being adapted to provide said $Y_1$ Time pulses; said input of said first monstable device being adapted to receive said STOP SERIAL TEST command; said second input of said eighth AND circuit being connected to said fourth input terminal of said Decode circuit, said output of said eighth AND circuit being adapted to provide said TEST TESTER command, said first input of said ninth AND circuit being connected to said fifth input terminal of said Decode circuit, said output of said ninth AND circuit being adapted to provide said SET-UP MODE command; said first, third and fourth inputs of said eleventh AND circuit being respectively connected to said fifth, third and fourth input terminals of said Decode circuit, said output of said eleventh AND circuit being adapted to provide said SET CLOCK 1 command; a sixth INVERTER circuit having an input and an output and coupling said output of said first monostable device to said second input of said twelfth AND circuit, said output of said sixth INVERTER circuit being adapted to provide said Z pulses and said output of said twelfth AND circuit being adapted to provide a time delayed TEST SERIAL command; and said first input of said OR circuit being connected to said output of said first monostable device, said output of said OR circuit being adapted to provide a time-delayed NOT TEST SERIAL command; whereby a test system employing said Decode circuit will execute upon command a SET SERIAL NUMBER of TESTS operation, a TEST SERIAL operation, a SET DISCONNECT operation, a SET PIN SERIAL operation, a TEST PARALLEL operation, or a TEST TESTER operation.

48. A closed loop binary shift register having n stages, said shift register being adapted to receive in parallel an input word having *n* binary bits and provide in parallel an output word having *n* binary bits, where said output word is said input word shifted zero, one, or more, shift register stages, said shift register including: *n* binary stages; each of said *n* binary stages having, a data stage input terminal, a data stage control terminal, a data interstage input terminal, a data interstage control terminal, an interstage output terminal, a stage output terminal, a register accept data control terminal, and a shift data control terminal; a first AND circuit having a first input connected to said data stage input terminal, a second input connected to said data stage control terminal, and an output; a second AND circuit having a first input connected to said data interstage control terminal, a second input connected to said data interstage input terminal, and an output; an OR circuit having a first input connected to said output of said first AND circuit, a second input connected to said output of said second AND circuit, and an output; a first settable latch circuit having a first input connected to said output of said OR circuit, a second input connected to said register accept data control terminal, and an output connected to said stage output terminal; a second settable latch circuit having a first input connected to said output of said first settable latch circuit, a second input connected to said shift data control terminal and an output connected to said data interstage output terminal; *n* connections respectively connecting said interstage output terminals of said 1st, 2nd, 3rd, 4th, 5th----$n$-3, $n$-2, $n$-1 and $n^{th}$ stages to said data interstage input terminals of said $n$th 1, 2, 3, 4----$n$-4, $n$-3, $n$-2 and $n$-$1^{th}$ stages; first connection means connecting in common the data stage control terminals of said *n* stages; second connection means connecting in common the data interstage control terminals of said *n* stages; third connection means connecting in common the register accept data control terminal of said *n* stages; and, fourth connection means connecting in common the shift data control terminals of said *n* stages, whereby an *n* bit binary word impressed on said *n* data stage input terminals will be accepted by, and stored in said *n* first settable latches when said first connection means and said third connection means are respectively conditioned by electrical manifestations impressed thereon, and subsequent thereto the *n* binary bit word stored in said *n* first settable latches will be shifted one stage for each successive time said second and fourth connection means are respectively conditioned by electrical manifestations impressed thereon.

49. A pin circuit for use in a high speed tester for testing large scale integration devices, where said tester employs at least a plurality of operational code specifying bits, a SET DISCONNECT electrical manifestation, a TEST PARALLEL electrical manifestation, a SET PIN SERIAL electrical manifestation, a TEST TESTER electrical manifestation, a SET-UP mode electrical instruction, a SET CLOCK 1 electrical manifestation, a TEST SERIAL electrical manifestation, a TEST mode electrical instruction, DRIVE TIME pulses, STROBE TIME pulses and CLOCK 1 pulses and provides at least GO/NO-GO pulses, said pin circuit being conditionable to perform a plurality of functions expressly including the following, driver, load, open and ground, said pin circuit comprising: a test data input terminal for accepting test data and a DUT connection terminal for connection to a contact pin, or pad, of a large scale integration device under test; first, second, third, fourth, fifth, sixth, seventh and eighth settable polarity hold latches, each of said latches having an information input, a control input and an output; first, second and third switches, each of said switches having first and second terminal means and a control input whereby the open or closed status of said switch may be controlled by an electrical condition; first, second and third AND circuits respectively having first and second inputs and an output; fourth, fifth, sixth and seventh AND circuits respectively having first, second and third inputs and an output; first and second EXCLUSIVE OR circuits respectively having first and second inputs and an output; first and second OR circuits respectively having first and second inputs and an output; a settable DRIVER circuit having an input and output, said DRIVER circuit being adapted to provide a first electrical manifestation at said output thereof in response to a first electrical condition impressed on said input thereof and a second electrical manifestation at said output thereof in response to a second electrical condition impressed on said input thereof; a settable DETECTOR circuit having an input and an output, said DETECTOR circuit being adapted to provide as an output a first signal when an electrical status equal to or less than a predetermined set standard is impressed on the input thereof and a second signal when an electrical status greater than said predetermined set standard is impressed on the input thereof; an electrical load,; first connection means connecting in common said data input terminal of said pin circuit, said information input of said first latch, said information input of said second latch, said second input of said first AND circuit, said information input of said sixth latch, said information input of said eighth latch, and said second input of said first EXCLUSIVE OR circuit; said control input of said first latch being adapted to receive a SET Disconnect electrical command, a first INVERTER circuit connected between said output of said first latch and said control input of said first switch; second connection means connecting in common said first terminal means of said first, second and third switches and said input of said DETECTOR circuit; third connection means connecting said output of said Driver circuit to said second terminal means of said third switch; fourth connection means connecting said second terminal means of said first switch and said DUT connection terminal of said PIN circuit; fifth connection means connecting said second terminal means of said second switch to said electrical load; said first input of said first OR circuit being adapted to receive a TEST PARALLEL electrical command, said control input of said second latch being adapted to receive a SET PIN SERIAL electrical command, said second input of said first OR circuit being connected to said output of said second latch, said output of said first OR circuit being connected to said first input of said fourth AND circuit and said first input of said second AND circuit; said information input of said third latch being adapted to receive an electrical manifestation of a first one of said plurality of Operational Code specifying bits, said output of said third latch being connected to said control input of said second switch; said first input of said second OR circuit being adapted to receive a TEST TESTER electrical command, said output of said second OR circuit being connected to said first input of said sixth AND circuit; said information input of said fourth latch being adapted to receive an electrical manifestation of a second one of said plurality of operational code specifying bits, said output of said fourth latch being connected to the control input of said third switch and the second input of said second AND circuit, a second INVERTER circuit connected between the output of said fourth latch and said second input of said fourth AND circuit; said information input of said fifth latch being adapted to receive an electrical manifestation of a third one of said plurality of operational code specifying bits; a third INVERTER circuit connected between the output of said fifth latch and the third input of said fourth AND circuit; said first input of said first AND circuit being adapted to receive a SET-UP mode electrical instruction, said output of said first AND circuit being connected to the control inputs of said third, fourth and fifth latches; said first input of said fifth AND circuit being connected to said output of said second AND circuit; said second input of said fifth AND circuit being adapted to receive Drive Time pulses, said third input of said fifth AND circuit, said third input of said sixth AND circuit and said first input of said third AND circuit being respectively adapted to receive a TEST mode electrical instruction, said output of said fifth AND circuit being connected to said control input of said sixth latch, said output of said sixth latch being connected to said second input of said second Exclusive OR circuit and said output of said second Exclusive OR circuit being connected to said input of said Driver circuit; said first input of said first Exclusive OR circuit being connected to the output of said DETECTOR circuit, the output of said first Exclusive OR circuit being connected to the information input of said seventh latch; said second input of said third AND circuit being adapted to receive STROBE-TIME pulses, the output of said third AND circuit being connected to said control input of said seventh latch, the output of said seventh latch being connected to said second input of said sixth AND circuit, and the output of said sixth AND circuit being adapted to provide a GO/NO-GO electrical representation; said control input of said eighth latch being adapted to receive a SET CLOCK 1 command, said output of said eighth latch being connected to said first input of said seventh AND circuit, said second input of said seventh AND circuit being adapted to receive a TEST SERIAL command, said third input of said seventh AND circuit being adapted to receive CLOCK 1 pulses, and said output of said seventh AND circuit being connected to said first input of said second Exclusive OR circuit; whereby said pin circuit is conditionable to perform any one of said plurality of functions respectively in accord with the operation of said tester as called for by said commands and said plurality of operational code specifying bits.

50. A Decode circuit for use in a high speed electronic test system for testing high density circuit devices said tester performing a number of operations respectively initiated by operational code specifying bits, said Decode circuit being adapted to receive and respond to four operational codes specifying bits, Y-Time pulses and a STOP SERIAL TEST command in the form of an electrical manifestation, said Decode circuit being adapted to provide a plurality of commands respectively in the form of electrical manifestations, said plurality of electrical manifestations including the following SET NUMBER SERIAL TESTS command, TEST SERIAL command, NOT TEST SERIAL command, TEST MODE command, SET DISCONNECT command, SET PIN SERIAL command, TEST PARALLEL command, TEST TESTER command, a SET-UP MODE command, a SET CLOCK 1 command, a STOP RAM command, $Y_1$-TIME pulses, Z pulses and $\overline{Z}$ pulses, said Decode circuit being operative during each test cycle of a test operations including a sizeable number of test cycles, where each test cycle of said test system is controlled, at least in part, by one or more of said electrical commands, said Decode circuit comprising; first, second, third and fourth input terminals for respectively receiving said first, second, third and fourth operational code specifying bits, and a fifth input terminal for receiving said Y-TIME pulses; first, second, ninth, ninth and twelfth AND circuits respectively having first and second inputs and an output; sixth, seventh, eighth and tenth AND circuits respectively having first, second and third inputs and an output; third, fourth, fifth, and eleventh AND circuits respectively having first, second, third, and fourth inputs and an output; first and second monostable devices respectively having an input and an output; a bistable device having a SET input, a RESET input and an output; an OR circuit having first and second inputs and an output; said first input of said first AND circuit being connected to said first input terminal of said Decode circuit, a first INVERTER circuit connected between said second input terminal of said Decode circuit and said second input of said first AND circuit, and said output of said first AND circuit being connected to said first input of said third AND circuit, said fourth input of said fourth AND circuit, said first input of said fifth AND circuit, and said second input of said eleventh AND circuit; said first input of said second AND circuit being connected to said first input terminal of said Decode circuit, said second input of said second AND circuit being connected to said second input terminal of said Decode circuit, said output of said second AND circuit being connected to said first input of said sixth AND circuit, said first input of said seventh AND circuit, said first input of said eighth AND circuit, and said third input of said tenth AND circuit, and being adapted to provide said TEST MODE command; a second INVERTER circuit connected between said first input terminal of said Decode circuit and said second input of said ninth AND circuit; a third INVERTER circuit connected between said third input terminal of said Decode circuit and said third input of said first AND circuit, said third input of said fifth AND circuit, and said third input of said eighth AND circuit; a fourth INVERTER circuit connected between said fourth input terminal of said Decode circuit and said fourth input of said first AND circuit, said third input of said second AND circuit, and said third input of said seventh AND circuit; said second input of said third AND circuit being connected to said fifth input terminal of said Decode circuit, said output of said third AND circuit being adapted to provide said SET NUMBER of SERIAL TESTS command; said first input of said fourth AND circuit being connected to said fifth input terminal of said Decode circuit, said second input of said fourth AND circuit being connected to said third input terminal of said Decode circuit, and said output of said fourth AND circuit being adapted to provide said SET DISCONNECT command; said second input of said fifth AND circuit being connected to said fifth input terminal of said Decode circuit, said fourth input of said fifth AND circuit being connected to said fourth input terminal of said Decode circuit, and said output of said fifth AND circuit being adapted to provide a SET PIN SERIAL command; said second input of said sixth AND circuit being connected to said third input terminal of said Decode circuit, said third input of said sixth AND circuit being connected to said fourth input terminal of said Decode circuit, said output of said sixth AND circuit being adapted to provide said TEST PARALLEL command; said second input of said seventh AND circuit being connected to said third input terminal of said Decode circuit, said output of said seventh AND circuit being connected to said second input of said twelfth AND circuit and said input of said second monostable device, and said output of said seventh AND circuit being adapted to provide said TEST SERIAL command; a fifthe INVERTER circuit connected to said output of said seventh AND circuit and said second input of said OR circuit; said set input of said bistable device being connected to said output of said second monostable device, said output of said second monostable device being adapted to provide said Z pulses, said reset input of said bistable device being connected to said output of said first monostable device; said first input of said tenth AND circuit being connected to said fifth input terminal of said Decode circuit, said second input of said tenth AND circuit being connected to said output of said bistable device, said output of said bistable device being adapted to provide said STOP RAM command, and said output of said tenth AND circuit being adapted to provide said $Y_1$ Time pulses; said input of said first monostable device being adapted to receive said STOP SERIAL TEST command; said second input of said eighth AND circuit being connected to said fourth input terminal of said Decode circuit, said output of said eighth AND circuit being adapted to provide said TEST TESTER command, said first input of said ninth AND circuit being connected to said fifth input terminal of said Decode circuit, said output of said ninth AND circuit being adapted to provide said SET-UP MODE command; said first, third and fourth inputs of said eleventh AND circuit being respectively connected to said fifth, third and fourth input terminals of said Decode circuit, said output of said eleventh AND circuit being adapted to provide said SET CLOCK 1 command; a sixth INVERTER circuit having an input and an output and coupling said output of said first monostable device to said second input of said twelfth AND circuit, said output of said sixth INVERTER circuit being adapted to provide said Z pulses and said ouput of said twelfth AND circuit being adapted to provide a time delayed TEST SERIAL command; and said first input of said OR circuit being connected to said output of said first monostable device, said output of said OR circuit being adapted to provide a time-delayed NOT TEST SERIAL command; whereby a test system employing said Decode circuit will execute upon command a SET SERIAL NUMBER of TESTS operation, a TEST SERIAL operation, a SET DISCONNECT operation, a SET PIN SERIAL operation, a TEST PARALLEL operation, or a TEST TESTER operation.

51. In a high speed electronic test system, for testing high circuit density devices fabricated by large scale integration techniques, said test system employing a pattern of parallel test data and a pattern of serial test data and where said serial test data bears a known fixed relationship to said parallel test data, said test system being responsive to a controller and including test data processing means, said test data processing means comprising: storage means for storing said parallel test data pattern and a selected portion of said serial test data pattern, said portion of said serial test data pattern being stored in a format in accordance with said known fixed relationship of said serial test data to said parallel test data; and, circuit means, responsive to said controller and cooperating with said storage means for on as called for basis by the controller constructing from said parallel test data pattern and said selected portion of said serial test data pettern, a complete serial test pattern, whereby the storage capacity required to store mixed parallel serial test data is minimized.

* * * * *